US012452113B1

(12) United States Patent
Fang et al.

(10) Patent No.: US 12,452,113 B1
(45) Date of Patent: Oct. 21, 2025

(54) TRANSCEIVER DECODING METHOD AND SYSTEM BASED ON PROTOGRAPH DIFFERENTIAL CHAOS SHIFT KEYING

(71) Applicant: Guangdong University of Technology, Guangdong (CN)

(72) Inventors: Yi Fang, Guangdong (CN); Yuyi He, Guangdong (CN); Liang Lv, Guangdong (CN); Liuguo Yin, Guangdong (CN); Pingping Chen, Guangdong (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 19/235,482

(22) Filed: Jun. 11, 2025

(30) Foreign Application Priority Data

Jun. 17, 2024 (CN) .......................... 202410773836.9

(51) Int. Cl.
*H04L 27/00* (2006.01)
*H04L 1/00* (2006.01)

(52) U.S. Cl.
CPC .......... *H04L 27/001* (2013.01); *H04L 1/0057* (2013.01)

(58) Field of Classification Search
CPC ........................... H04L 27/001; H04L 1/0057
See application file for complete search history.

(56) References Cited

U.S. PATENT DOCUMENTS

| 7,802,171 | B2 * | 9/2010 | Li | ........................ H04L 27/2647 714/790 |
| 11,888,657 | B2 * | 1/2024 | Fang | ..................... H04L 27/001 |
| 12,088,440 | B1 * | 9/2024 | Fang | ................... H04L 27/2607 |
| 2005/0041746 | A1 * | 2/2005 | Rosen | ................. H04B 1/7163 375/242 |
| 2005/0084031 | A1 * | 4/2005 | Rosen | ..................... H04B 1/69 375/295 |

(Continued)

FOREIGN PATENT DOCUMENTS

| CN | 1674483 A | 9/2005 |
| CN | 110601699 A | 12/2019 |

(Continued)

*Primary Examiner* — Gary S Gracia

(57) ABSTRACT

Disclosed are a transceiver decoding method and system based on protograph differential chaos shift keying (DCSK), the method including acquiring an information bit sequence, performing a coded modulation on the information bit sequence via a protograph DCSK transmitter, and outputting a plurality of modulated symbols; inputting each modulated symbol into a wireless channel for channel interference, and outputting a received symbol corresponding to each modulated symbol; using a target extrinsic information-aided network to determine a target a-posteriori probability vector corresponding to each received symbol; inputting each target a-posteriori probability vector into an a-priori calculation decoder for decoding, and outputting an initial decoded bit sequence; and determining a target decoded bit sequence according to the initial decoded bit sequence and a preset check matrix. The technical problem of lower decoding accuracy caused by the existing transceiver decoding methods designed for a DCSK system is solved.

9 Claims, 7 Drawing Sheets

(56) References Cited

U.S. PATENT DOCUMENTS

| | | | |
|---|---|---|---|
| 2005/0084033 A1* | 4/2005 | Rosen | H04L 27/2601 375/295 |
| 2005/0100076 A1* | 5/2005 | Gazdzinski | H04B 1/7176 375/242 |
| 2005/0249271 A1* | 11/2005 | Lau | H04L 27/001 375/295 |
| 2006/0156421 A1* | 7/2006 | Cagan | A01K 67/68 800/13 |
| 2006/0208930 A1* | 9/2006 | Harada | H03M 13/1171 341/50 |
| 2007/0030926 A1* | 2/2007 | Brown | H04L 27/233 375/132 |
| 2012/0250783 A1* | 10/2012 | Terry | H04L 27/001 708/200 |
| 2014/0169407 A1* | 6/2014 | Terry | H04B 1/707 375/147 |
| 2016/0301551 A1* | 10/2016 | Terry | H04L 5/0023 |
| 2017/0033833 A1* | 2/2017 | Terry | H04W 12/062 |
| 2019/0273560 A1* | 9/2019 | Horikoshi | H04B 10/5161 |
| 2021/0021296 A1* | 1/2021 | Ren | H04B 1/7093 |
| 2021/0328840 A1* | 10/2021 | Pandya | H04L 27/3488 |
| 2022/0278698 A1* | 9/2022 | Koike-Akino | G06F 13/4027 |
| 2023/0421419 A1* | 12/2023 | Fang | H04L 27/148 |
| 2024/0154626 A1* | 5/2024 | Wesel | H03M 13/6597 |
| 2024/0273343 A1* | 8/2024 | Fang | G06N 3/08 |
| 2025/0192918 A1* | 6/2025 | Lin | H03M 13/6393 |

FOREIGN PATENT DOCUMENTS

| | | |
|---|---|---|
| EP | 1039706 A1 | 9/2000 |
| EP | 3361659 A1 | 8/2018 |
| WO | 2024031979 A1 | 2/2024 |

* cited by examiner

TRANSCEIVER DECODING METHOD AND SYSTEM BASED ON PROTOGRAPH DIFFERENTIAL CHAOS SHIFT KEYING

CROSS-REFERENCE TO RELATED APPLICATION

This application claims priority of Chinese Patent Application No. 202410773836.9, filed on Jun. 17, 2024, the entire contents of which are incorporated herein by reference.

TECHNICAL FIELD

The disclosure relates to the technical field of wireless communication, and in particular relates to a transceiver decoding method and system based on protograph differential chaos shift keying (DCSK).

BACKGROUND

Following the popularization of information industry, mobile internet services are experiencing explosive growth. The massive amount of service data gives rise to severe challenges to the data rate, spectrum efficiency and reliability of the next-generation wireless communication networks. Therefore, the research on wireless communication technologies featuring low power consumption, low cost, high efficiency and reliability is extremely urgent.

Chaos theory is an important branch of nonlinear science, originated from the sensitivity of nonlinear systems to initial conditions. As an interdisciplinary theory, chaos theory is extensively applied in fields such as meteorology, biology, economics, physics and telecommunication. Chaos communication is a scientific theory where chaotic signals are applied to the field of communication, mainly utilizing determinacy, sensitivity to initial values, wide spectrum, noise-like properties and other advantageous properties of the chaotic signals. These inherent properties give chaos communication systems potential advantages in terms of secure communication, anti-interference, anti-multipath fading, etc. Currently, the research on wireless communication of chaos communication is mainly focused on chaotic digital modulation. DCSK technology, featuring advantages of low power consumption and low cost, has become a widely studied non-coherent chaotic digital modulation scheme.

Most of the existing transceiver decoding methods designed for DCSK systems use energy detection as symbol detection via demodulators, focusing on the energy features of the received chaotic sequences, so as to complete decoding process. However, this process fails to use the correlation characteristics between chaotic sequences, affecting the performance of protograph DCSK coded modulation systems, thus resulting in lower decoding accuracy.

SUMMARY

The disclosure provides a transceiver decoding method and system based on protograph DCSK, to solve the technical problem of lower decoding accuracy caused by the existing transceiver decoding methods designed for a DCSK system.

In a first aspect of the disclosure, a transceiver decoding method based on protograph DCSK is provided. A transceiver includes a protograph DCSK transmitter, a wireless channel, a target extrinsic information-aided network and an a-priori calculation decoder. The method includes:

acquiring an information bit sequence, performing a coded modulation on the information bit sequence via the protograph DCSK transmitter, and outputting a plurality of modulated M-ary DCSK symbols;

inputting each modulated M-ary DCSK symbol into the wireless channel for channel interference, and outputting a received M-ary DCSK symbol corresponding to each modulated M-ary DCSK symbol;

using the target extrinsic information-aided network to determine a target a-posteriori probability vector corresponding to each received M-ary DCSK symbol according to each received M-ary DCSK symbol and a preset initial a-posteriori probability vector corresponding to each received M-ary DCSK symbol;

inputting each target a-posteriori probability vector into the a-priori calculation decoder for decoding, and outputting an initial decoded bit sequence; and determining a target decoded bit sequence according to the initial decoded bit sequence and a preset check matrix.

Alternatively, the protograph DCSK transmitter includes a protograph encoder and an M-ary DCSK modulator; and the step of performing a coded modulation on the information bit sequence via the protograph DCSK transmitter, and outputting a plurality of modulated M-ary DCSK symbols includes:

encoding the information bit sequence using the protograph encoder to generate an encoded bit sequence;

dividing the encoded bit sequence according to a preset number of encoded bits, and outputting a plurality of groups of encoded bits; and inputting each encoded bit into the M-ary DCSK modulator for modulation to determine the plurality of modulated M-ary DCSK symbols.

Alternatively, the target extrinsic information-aided network includes a convolutional neural network-long short-term memory (CNN-LSTM) block, a fully connected (FC) block and a decision block; and the step of using the target extrinsic information-aided network to determine a target a-posteriori probability vector corresponding to each received M-ary DCSK symbol according to each received M-ary DCSK symbol and a preset initial a-posteriori probability vector corresponding to each received M-ary DCSK symbol includes:

using the CNN-LSTM block to perform one-dimensional feature extraction on each received M-ary DCSK symbol, and generating a first feature vector corresponding to each received M-ary DCSK symbol;

using the FC block to perform vector feature extraction on the preset initial a-posteriori probability vector corresponding to each received M-ary DCSK symbol, and determining a second feature vector corresponding to each preset initial a-posteriori probability vector; and inputting each first feature vector and each second feature vector into the decision block for feature concatenating separately, and outputting the target a-posteriori probability vector corresponding to each received M-ary DCSK symbol.

Alternatively, the CNN-LSTM block includes a one-dimensional convolutional (Conv1D) layer, a batch normalized (BN) layer, a first activation function layer and a long short-term memory (LSTM) layer; and the step of using the CNN-LSTM block to perform one-dimensional feature extraction on each received M-ary DCSK symbol, and generating a first feature vector corresponding to each received M-ary DCSK symbol includes:

performing a one-dimensional convolutional operation on each received M-ary DCSK symbol via the Conv1D layer to generate a first convolutional feature corresponding to each received M-ary DCSK symbol;

normalizing each first convolutional feature using the BN layer to determine a first normalized feature corresponding to each first convolutional feature;

inputting each first normalized feature into the first activation function layer for nonlinear mapping to generate a nonlinear feature corresponding to each first normalized feature;

performing the one-dimensional convolutional operation on each nonlinear feature via the Conv1D layer to generate a second convolutional feature corresponding to each nonlinear feature;

normalizing each second convolutional feature using the BN layer to determine a second normalized feature corresponding to each second convolutional feature;

inputting each second normalized feature into the first activation function layer for nonlinear mapping to generate a two-dimensional feature matrix corresponding to each second normalized feature;

sequentially inputting column data of each two-dimensional feature matrix into the LSTM layer for feature extraction according to a column sequence number of each two-dimensional feature matrix to generate a plurality of initial feature vectors corresponding to each two-dimensional feature matrix; and screening the plurality of initial feature vectors corresponding to each two-dimensional feature matrix to determine a first feature vector corresponding to each two-dimensional feature matrix.

Alternatively, the FC block includes a fully connected layer (FCL), a BN layer and a first activation function layer; and the step of using the FC block to perform vector feature extraction on the preset initial a-posteriori probability vector corresponding to each received M-ary DCSK symbol, and determining a second feature vector corresponding to each preset initial a-posteriori probability vector includes:

performing feature mapping on the preset initial a-posteriori probability vector corresponding to each received M-ary DCSK symbol via the FCL to generate a first a-posteriori probability mapping feature corresponding to each preset initial a-posteriori probability vector;

performing normalization and nonlinear mapping on each first a-posteriori probability mapping feature using the BN layer and the first activation function layer, respectively, to determine a first probability nonlinear feature corresponding to each first a-posteriori probability mapping feature;

performing feature mapping on each first probability nonlinear feature via the FCL to generate a second a-posteriori probability mapping feature corresponding to each first probability nonlinear feature;

performing normalization and nonlinear mapping on each second a-posteriori probability mapping feature using the BN layer and the first activation function layer, respectively, to determine a second probability nonlinear feature corresponding to each second a-posteriori probability mapping feature;

performing feature mapping on each second probability nonlinear feature via the FCL to generate a third a-posteriori probability mapping feature corresponding to each second probability nonlinear feature; and performing normalization and nonlinear mapping on each third a-posteriori probability mapping feature using the BN layer and the first activation function layer, respectively, to determine a second feature vector corresponding to each third a-posteriori probability mapping feature.

Alternatively, the decision block includes an FCL, a BN layer, a first activation function layer and a second activation function layer; and the step of inputting each first feature vector and each second feature vector into the decision block for feature concatenating separately, and outputting the target a-posteriori probability vector corresponding to each received M-ary DCSK symbol includes:

separately performing one-dimensional concatenation on each first feature vector and each second feature vector to generate a concatenated feature vector corresponding to each received M-ary DCSK symbol;

performing feature mapping on each concatenated feature vector via the FCL to determine a first concatenated mapping feature corresponding to each concatenated feature vector;

performing normalization and nonlinear mapping on each first concatenated mapping feature using the BN layer and the first activation function layer, respectively, to generate a first concatenated nonlinear feature corresponding to each first concatenated mapping feature;

performing feature mapping on each first concatenated nonlinear feature via the FCL to determine a second concatenated mapping feature corresponding to each first concatenated nonlinear feature; and performing nonlinear mapping on each second concatenated mapping feature using the second activation function layer to generate a target a-posteriori probability vector corresponding to each second concatenated mapping feature.

Alternatively, the a-priori calculation decoder includes an a-priori log-likelihood ratio (LLR) calculation block and a protograph decoder; and the step of inputting each target a-posteriori probability vector into the a-priori calculation decoder for decoding, and outputting an initial decoded bit sequence includes:

performing a-priori conversion on each target a-posteriori probability vector via the a-priori LLR calculation block to determine an a-priori LLR vector corresponding to each target a-posteriori probability vector;

inputting each a-priori LLR vector into the protograph decoder for protograph decoding to generate an a-posteriori LLR vector corresponding to each a-priori LLR vector; and performing hard decision on each a-posteriori LLR vector to generate an initial decoded bit sequence.

Alternatively, the step of determining a target decoded bit sequence according to the initial decoded bit sequence and a preset check matrix includes:

performing a multiplication operation on the initial decoded bit sequence and the preset check matrix to determine a sequence-matrix product value, and counting the number of iterations in real-time;

taking the initial decoded bit sequence as a target decoded bit sequence in a case that the sequence-matrix product value is zero or the number of iterations reaches the preset number of global iterations;

separately performing a difference operation on each a-priori LLR vector corresponding to each target a-posteriori probability vector and each a-posteriori LLR vector in a case that the sequence-matrix product value is not zero and the number of iterations does not reach the preset number of global iterations, and outputting an extrinsic information vector corresponding to each target a-posteriori probability vector;

using elements of each extrinsic information vector to update elements of each preset initial a-posteriori probability vector corresponding to each received M-ary DCSK symbol, and determining a new preset initial a-posteriori probability vector corresponding to each received M-ary DCSK symbol;

determining the sequence-matrix product value according to each received M-ary DCSK symbol and each new preset initial a-posteriori probability vector until the sequence-matrix product value is zero or the number of iterations reaches the preset number of global iterations; and taking the initial decoded bit sequence determined in a case that the sequence-matrix product value is zero or the number of iterations reaches the preset number of global iterations as the target decoded bit sequence.

Alternatively, a training process of the target extrinsic information-aided network includes:

acquiring an information bit sequence to be trained, performing a coded modulation on the information bit sequence to be trained via the protograph DCSK transmitter, and outputting a plurality of modulated M-ary DCSK symbols to be trained;

inputting each modulated M-ary DCSK symbol to be trained into the wireless channel for channel interference, and outputting a received M-ary DCSK symbol to be trained corresponding to each modulated M-ary DCSK symbol to be trained;

calculating an initial a-posteriori probability vector to be trained corresponding to each received M-ary DCSK symbol to be trained according to each received M-ary DCSK symbol to be trained using a preset LLR calculation method; and on the basis of a preset cross-entropy loss function, performing network training on an initial extrinsic information-aided network using each received M-ary DCSK symbol to be trained and each initial a-posteriori probability vector to be trained, and determining a well-trained target extrinsic information-aided network.

In a second aspect of the disclosure, a transceiver decoding system based on protograph DCSK is provided. A transceiver includes a protograph DCSK transmitter, a wireless channel, a target extrinsic information-aided network and an a-priori calculation decoder. The system includes:

an acquisition block, configured to acquire an information bit sequence, perform a coded modulation on the information bit sequence via the protograph DCSK transmitter, and output a plurality of modulated M-ary DCSK symbols;

an interference block, configured to input each modulated M-ary DCSK symbol into the wireless channel for channel interference, and output a received M-ary DCSK symbol corresponding to each modulated M-ary DCSK symbol;

a network output block, configured to use the target extrinsic information-aided network to determine a target a-posteriori probability vector corresponding to each received M-ary DCSK symbol according to each received M-ary DCSK symbol and a preset initial a-posteriori probability vector corresponding to each received M-ary DCSK symbol;

a decoding block, configured to input each target a-posteriori probability vector into the a-priori calculation decoder for decoding, and output an initial decoded bit sequence; and a determination block, configured to determine a target decoded bit sequence according to the initial decoded bit sequence and a preset check matrix.

It can be seen from the technical solutions described above that the disclosure has the following advantages.

The above-mentioned technical solutions of the disclosure provide a transceiver decoding method based on protograph DCSK. The transceiver includes a protograph DCSK transmitter, a wireless channel, a target extrinsic information-aided network and an a-priori calculation decoder. First, an information bit sequence is acquired, a coded modulation is performed on the information bit sequence via a protograph DCSK transmitter, and a plurality of modulated M-ary DCSK symbols are outputted; then, each modulated M-ary DCSK symbol is inputted into the wireless channel for channel interference, and a received M-ary DCSK symbol corresponding to each modulated M-ary DCSK symbol is outputted; a target extrinsic information-aided network is used to determine a target a-posteriori probability vector corresponding to each received M-ary DCSK symbol according to each received M-ary DCSK symbol and a preset initial a-posteriori probability vector corresponding to each received M-ary DCSK symbol; each target a-posteriori probability vector is inputted into the a-priori calculation decoder for decoding, and an initial decoded bit sequence is outputted; and finally, a target decoded bit sequence is determined according to the initial decoded bit sequence and a preset check matrix. According to the above-mentioned solutions, in the process of generating the target decoded bit sequence on the basis of the initial decoded bit sequence determined by the target extrinsic information-aided network and the preset check matrix, both the received M-ary DCSK symbol and the a-posteriori probability vector corresponding thereto are considered, thereby improving the performance of a protograph DCSK coded modulation system, and further improving the decoding accuracy.

BRIEF DESCRIPTION OF THE DRAWINGS

To state the technical solutions of the embodiments in the disclosure or the prior art clearer, the attached drawings needed in the description of embodiments or prior art are briefly introduced below. Obviously, the drawings described below are only some embodiments of the disclosure. For those skilled in the art, other drawings can be obtained according to these drawings without creative efforts.

DETAILED DESCRIPTION

Embodiments of the disclosure provide a transceiver decoding method and system based on protograph DCSK, to solve the technical problem of lower decoding accuracy caused by the existing transceiver decoding methods designed for a DCSK system.

To make the inventive purpose, features and advantages of the disclosure more obvious and understandable, the technical solutions of the embodiments in the disclosure will be described clearly and completely by reference to the attached drawings of the embodiments in the disclosure below. Obviously, the embodiments described are only some, rather than all embodiments of the disclosure. On the basis of the embodiments of the disclosure, all other embodiments obtained by those ordinary skilled in the art without creative efforts fall within the scope of protection of the disclosure.

Figure 1:
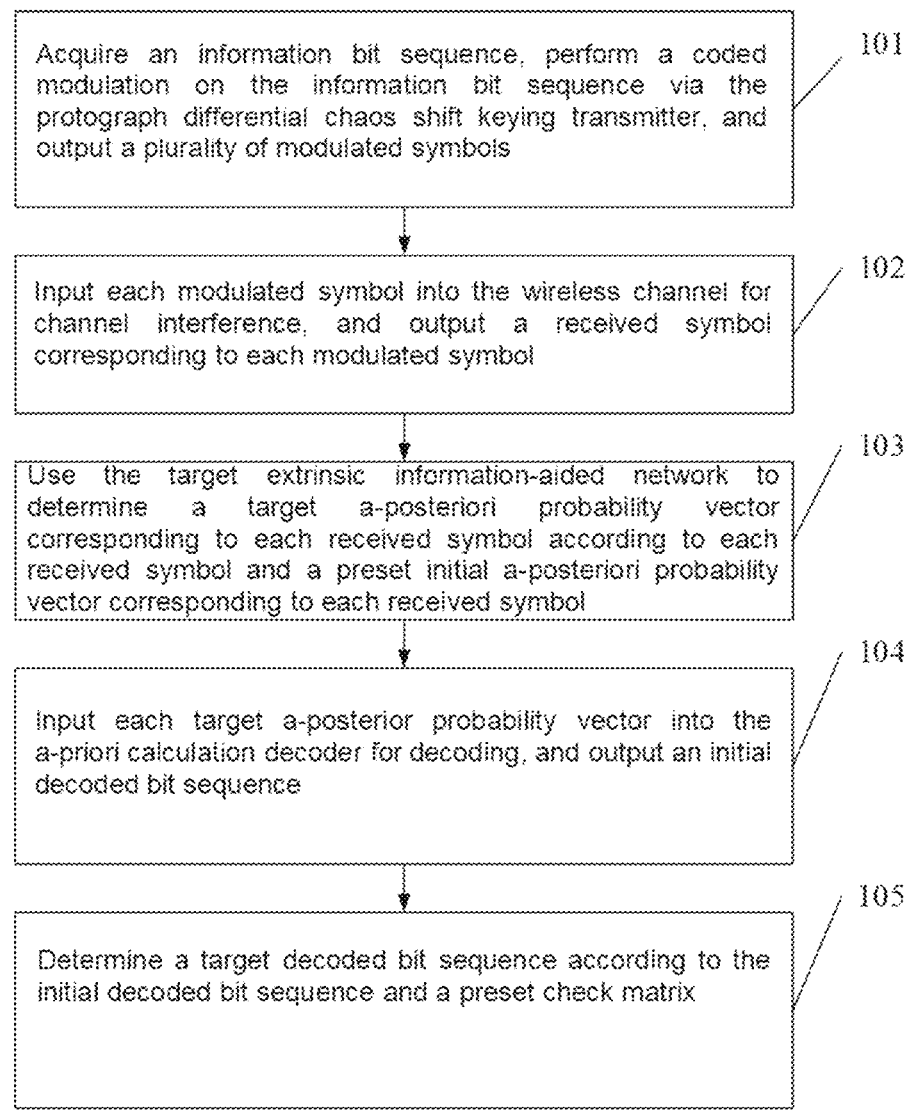
FIG. 1 is a step flowchart of a transceiver decoding method based on protograph DCSK provided in an embodiment of the disclosure.

Referring to FIG. 1, which is a step flowchart of a transceiver decoding method based on protograph DCSK provided in an embodiment of the disclosure.

The disclosure provides a transceiver decoding method based on protograph DCSK. A transceiver includes a protograph DCSK transmitter, a wireless channel, a target extrinsic information-aided network and an a-priori calculation decoder. The method includes the following steps.

Step 101, an information bit sequence is acquired, a coded modulation is performed on the information bit sequence via the protograph DCSK transmitter, and a plurality of modulated M-ary DCSK symbols are outputted.

Figure 2:
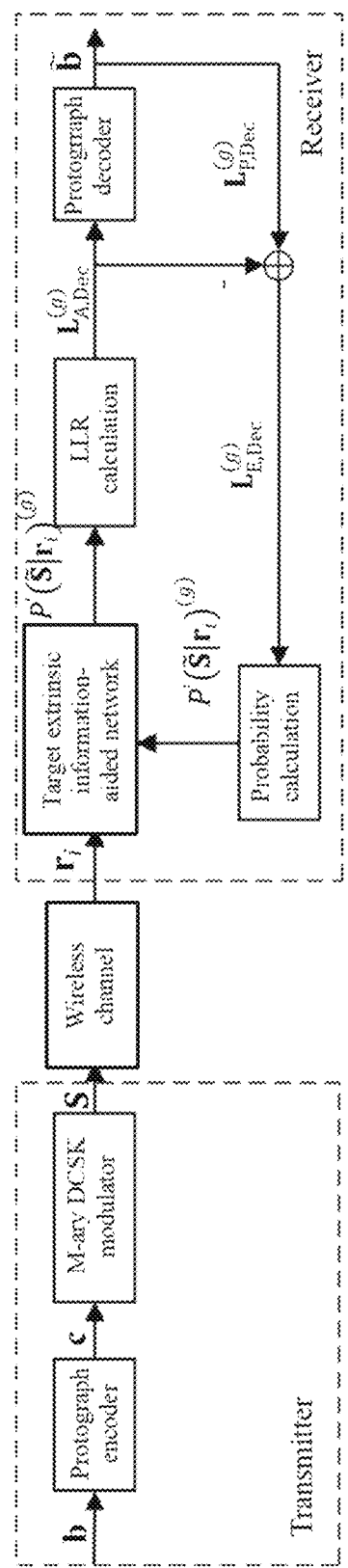
FIG. 2 is a structural schematic diagram of a transceiver provided in an embodiment of the disclosure.

It is to be noted that, referring to FIG. 2, the transceiver provided in the disclosure includes a protograph DCSK transmitter (transmitter), a wireless channel, and an extrinsic information receiver (receiver), of which, the protograph DCSK transmitter includes a protograph encoder and an M-ary DCSK modulator, the extrinsic information receiver includes a target extrinsic information-aided network, an a-priori calculation decoder and a probability calculation block, and the a-priori calculation decoder includes an a-priori LLR vector calculation block and a protograph decoder.

Specifically, the given information bit sequence is acquired, the information bit sequence is encoded using the protograph encoder to generate an encoded bit sequence; the encoded bit sequence is divided according to the preset number of encoded bits, and a plurality of groups of encoded bits are outputted; and each encoded bit is inputted into the M-ary DCSK modulator for modulation to determine a plurality of modulated M-ary DCSK symbols. The preset number of encoded bits refers to the number of encoded bits carried by a single M-ary DCSK symbol, and it can be set as needed, and the disclosure is not limited to this.

In the embodiment, the information bit sequence is acquired, the coded modulation is performed on the information bit sequence via the protograph DCSK transmitter, and a plurality of modulated M-ary DCSK symbols are outputted.

Step 102, each modulated M-ary DCSK symbol is inputted into the wireless channel for channel interference, and a received M-ary DCSK symbol corresponding to each modulated M-ary DCSK symbol is outputted.

It is to be noted that the wireless channel serves as the path between the protograph DCSK transmitter and the extrinsic information receiver. After the coded modulation by the protograph DCSK transmitter, the modulated M-ary DCSK symbol can be represented as $\tilde{S}_u = [w_{u,1}x, w_{u,2}x, \ldots, w_{u,M}x]$, which then undergoes channel interference through the wireless channel, and the received M-ary DCSK symbol corresponding to each modulated M-ary DCSK symbol is outputted. $S_u$ is the modulated M-ary DCSK symbol, $w_{u,1}$ is the first element in the $u_{th}$ row of a Walsh code, $w_{u,2}$ is the second element in the $u_{th}$ row of the Walsh code, $w_{u,M}$ is the $M_{th}$ element in the $u_{th}$ row of the Walsh code, x is a chaotic sequence, and the received M-ary DCSK symbol can be expressed as:

$$r = h\tilde{S}_u + \eta;$$

where r is the received M-ary DCSK symbol; h is a channel response factor; $\tilde{S}_u$ is the modulated M-ary DCSK symbol; and η is AWGN vector having the same size as the modulated M-ary DCSK symbol.

In the embodiment, each modulated M-ary DCSK symbol is inputted into the wireless channel for channel interference, and the received M-ary DCSK symbol corresponding to each modulated M-ary DCSK symbol is outputted.

Step 103, the target extrinsic information-aided network is used to determine a target a-posteriori probability vector corresponding to each received M-ary DCSK symbol according to each received M-ary DCSK symbol and a preset initial a-posteriori probability vector corresponding to each received M-ary DCSK symbol.

The target extrinsic information-aided network includes a CNN-LSTM block, an FC block and a decision block.

Specifically, the CNN-LSTM block is used to perform one-dimensional feature extraction on each received M-ary DCSK symbol, and a first feature vector corresponding to each received M-ary DCSK symbol is generated; the FC block is used to perform vector feature extraction on the preset initial a-posteriori probability vector corresponding to each received M-ary DCSK symbol, and a second feature vector corresponding to each preset initial a-posteriori probability vector is determined; and each first feature vector and each second feature vector are inputted into the decision block for feature concatenating separately, and the target a-posteriori probability vector corresponding to each received M-ary DCSK symbol is outputted. The preset initial a-posteriori probability vector is represented as $P(\tilde{S}|r_i)^{(0)} = \{1/M, 1/M, \ldots, 1/M\}$, where $P(\tilde{S}|r_i)^{(0)}$ is a preset initial a-posteriori probability vector in a case that the number of global iterations g=0, $\tilde{S}$ is a set of the modulated bits, $r_i$ is the $i_{th}$ received M-ary DCSK symbol, and M is a preset modulated order.

In the embodiment, the target extrinsic information-aided network is used to determine the target a-posteriori probability vector corresponding to each received M-ary DCSK symbol according to each received M-ary DCSK symbol and the preset initial a-posteriori probability vector corresponding to each received M-ary DCSK symbol.

Step 104, each target a-posteriori probability vector is inputted into the a-priori calculation decoder for decoding, and an initial decoded bit sequence is outputted.

The a-priori calculation decoder includes an a-priori LLR calculation block and a protograph decoder.

It is to be noted that, the LLR calculation block is used to perform a-priori conversion on each target a-posteriori probability vector, to determine the a-priori LLR vectors corresponding to each target a-posteriori probability vector. Specifically, for each received M-ary DCSK symbol, there is a corresponding modulated bit $\{c^1, c^2, \ldots, c^m\}$. The a-priori LLR calculation block is used to convert the elements in the target a-posteriori probability vector, to obtain the elements of the a-priori LLR vector corresponding to each modulated bit in each received M-ary DCSK symbol. Then, according to all the elements of the a-priori LLR vector, the a-priori LLR vector corresponding to each received M-ary DCSK symbol is obtained. The specific process for processing the elements of the a-priori LLR vector is as follows:

$$L_{A,Dec}^{(g)}(c^n) \log\left(\frac{\sum_{\tilde{S}_u \in S_0^n} p_{\tilde{S}_u}^{\prime(g)}}{\sum_{\tilde{S}_u \in S_1^n} p_{\tilde{S}_u}^{\prime(g)}}\right);$$

where $$L_{A,Dec}^{(g)}(c^n)$$

is an element of an a-priori LLR vector corresponding to the $n_{th}$ modulated bit in a case that the number of global iterations is g; $c^n$ is the $n_{th}$ modulated bit;

$$p_{\tilde{S}_u}^{\prime(g)}$$

is an element in a target a-posteriori probability vector in a case that the number of global iterations is g, and this element represents an a-posteriori probability of the modulated M-ary DCSK symbol $\tilde{S}_u$ outputted by the target extrinsic information-aided network; $\tilde{S}_u$ is the modulated M-ary DCSK symbol;

$$S_0^n$$

is a subset with the $n_{th}$ modulated bit being 0 in a modulated M-ary DCSK symbol set; and $$S_1^n$$

is a subset with the $n_{th}$ modulated bit being 1 in the modulated M-ary DCSK symbol set.

Furthermore, the decoding operation is performed using the a-priori LLR vectors corresponding to all the received M-ary DCSK symbols to output the initial decoded bit sequence. Specifically, each a-priori LLR vector is inputted into the protograph decoder for protograph decoding, and the a-posteriori LLR vector corresponding to each a-priori LLR vector is generated; and hard decision is applied to each a-posteriori LLR vector to generate the initial decoded bit sequence.

In the embodiment, each target a-posteriori probability vector is inputted into the a-priori calculation decoder for decoding, and the initial decoded bit sequence is outputted.

Step 105, a target decoded bit sequence is determined according to the initial decoded bit sequence and a preset check matrix.

It is to be noted that a multiplication operation is performed on the initial decoded bit sequence and the preset check matrix to determine the sequence-matrix product value, and the number of iterations is counted in real-time. In a case that the sequence-matrix product value is zero or the number of iterations reaches the preset number of global iterations, the initial decoded bit sequence is taken as the target decoded bit sequence; and in a case that the sequence-matrix product value is not zero and the number of iterations does not reach the preset number of global iterations, a probability calculation block is used to perform a difference operation on the a-priori LLR vector corresponding to each target a-posteriori probability vector and the a-posteriori LLR vector, respectively, and the extrinsic information vector corresponding to each target a-posteriori probability vector is outputted. The specific calculation process for the extrinsic information vectors is as follows:

$$L_{E,Dec}^{(g)} = L_{P,Dec}^{(g)} - L_{A,Dec}^{(g)};$$

where $$L_{E,Dec}^{(g)}$$

is an extrinsic information vector in a case that the number of global iterations is g;

$$L_{P,Dec}^{(g)}$$

is an a-posteriori LLR vector in a case that the number of global iterations is g; and $$L_{A,Dec}^{(g)}$$

is an a-priori LLR vector in a case that the number of global iterations is g.

Furthermore, the elements of the extrinsic information vector corresponding to each received M-ary DCSK symbol are utilized to update the elements of the preset initial a-posteriori probability vector corresponding to each received M-ary DCSK symbol. According to all the updated elements of the preset initial a-posteriori probability vector, new preset initial a-posteriori probability vectors are obtained, that is, the elements of each extrinsic information vector are used to update the elements of the preset initial a-posteriori probability vector corresponding to each received M-ary DCSK symbol, thereby determining the new preset initial a-posteriori probability vector corresponding to each received M-ary DCSK symbol. The specific process for updating the new preset initial a-posteriori probability vector is as follows:

$$p_{\tilde{S}_u}^{(g)} = \prod_{n=1}^{m} P(c^n = b \mid r_i)^{(g)};$$

where $$P(c^n = 0|r_i) = \frac{\exp(L_{E,Dec}^{(g-1)}(c^n))}{1 + \exp(L_{E,Dec}^{(g-1)}(c^n))},$$

and $P(c^n=1|r_i)^{(g)}=1-P(c^n=0|r_i)^{(g)}$;

$$p_{S_u}^{(g)}$$

is an element of a new preset initial a-posteriori probability vector in a case that the number of global iterations is g; m is the preset number of the modulated bits; $c^n$ is the $n_{th}$ modulated bit; $P(c^n=b|r_i)^{(g)}$ is an a-posteriori probability that the $n_{th}$ modulated bit corresponding to the received M-ary DCSK symbol is b in a case that the number of global iterations is g; $P(c^n=0|r_i)$ is an a-posteriori probability that the $n_{th}$ modulated bit corresponding to the received M-ary DCSK symbol is 0 in a case that the number of global iterations is g;

$$L_{E,Dec}^{(g-1)}(c^n)$$

is an element of an extrinsic information vector corresponding to the $n_{th}$ modulated bit in a case that the number of global iterations is g−1; $P(c^n=1|r_i)^{(g)}$ is an a-posteriori probability that the $n_{th}$ modulated bit corresponding to the received M-ary DCSK symbol is 1 in a case that the number of global iterations is g; and b is a constant, $b \in \{0,1\}$.

Furthermore, according to each received M-ary DCSK symbol and each new preset initial a-posteriori probability vector, the sequence-matrix product value is determined, that is, the target extrinsic information-aided network is used to determine the new target a-posteriori probability vector corresponding to each received M-ary DCSK symbol according to each received M-ary DCSK symbol and each new preset initial a-posteriori probability vector. Each new target a-posteriori probability vector is inputted into the a-priori calculation decoder for decoding, and the new initial decoded bit sequence is outputted; and a multiplication operation is performed on the new initial decoded bit sequence and the preset check matrix to determine the sequence-matrix product value until the sequence-matrix product value is zero or the number of iterations reaches the preset number of global iterations; and the initial decoded bit sequence determined in a case that the sequence-matrix product value is zero or the number of iterations reaches the preset number of global iterations is taken as the target decoded bit sequence. The preset number of global iterations can be set as needed, and the disclosure is not limited to this.

In the embodiment, the target decoded bit sequence is determined according to the initial decoded bit sequence and the preset check matrix.

In an embodiment of the disclosure, a transceiver decoding method based on protograph DCSK is provided. First, an information bit sequence is acquired, a coded modulation is performed on the information bit sequence via a protograph DCSK transmitter, and a plurality of modulated M-ary DCSK symbols are outputted; then, each modulated M-ary DCSK symbol is inputted into a wireless channel for channel interference, and a received M-ary DCSK symbol corresponding to each modulated M-ary DCSK symbol is outputted; a target extrinsic information-aided network is used to determine a target a-posteriori probability vector corresponding to each received M-ary DCSK symbol according to each received M-ary DCSK symbol and a preset initial a-posteriori probability vector corresponding to each received M-ary DCSK symbol; each target a-posteriori probability vector is inputted into an a-priori calculation decoder for decoding, and an initial decoded bit sequence is outputted; and finally, the target decoded bit sequence is determined according to the initial decoded bit sequence and the preset check matrix. According to the above-mentioned solutions, in the process of generating the target decoded bit sequence on the basis of the initial decoded bit sequence determined by the target extrinsic information-aided network and the preset check matrix, both the received M-ary DCSK symbol and the a-posteriori probability vector corresponding thereto are considered, thereby improving the performance of a protograph DCSK coded modulation system, and further improving the decoding accuracy.

Figure 3:
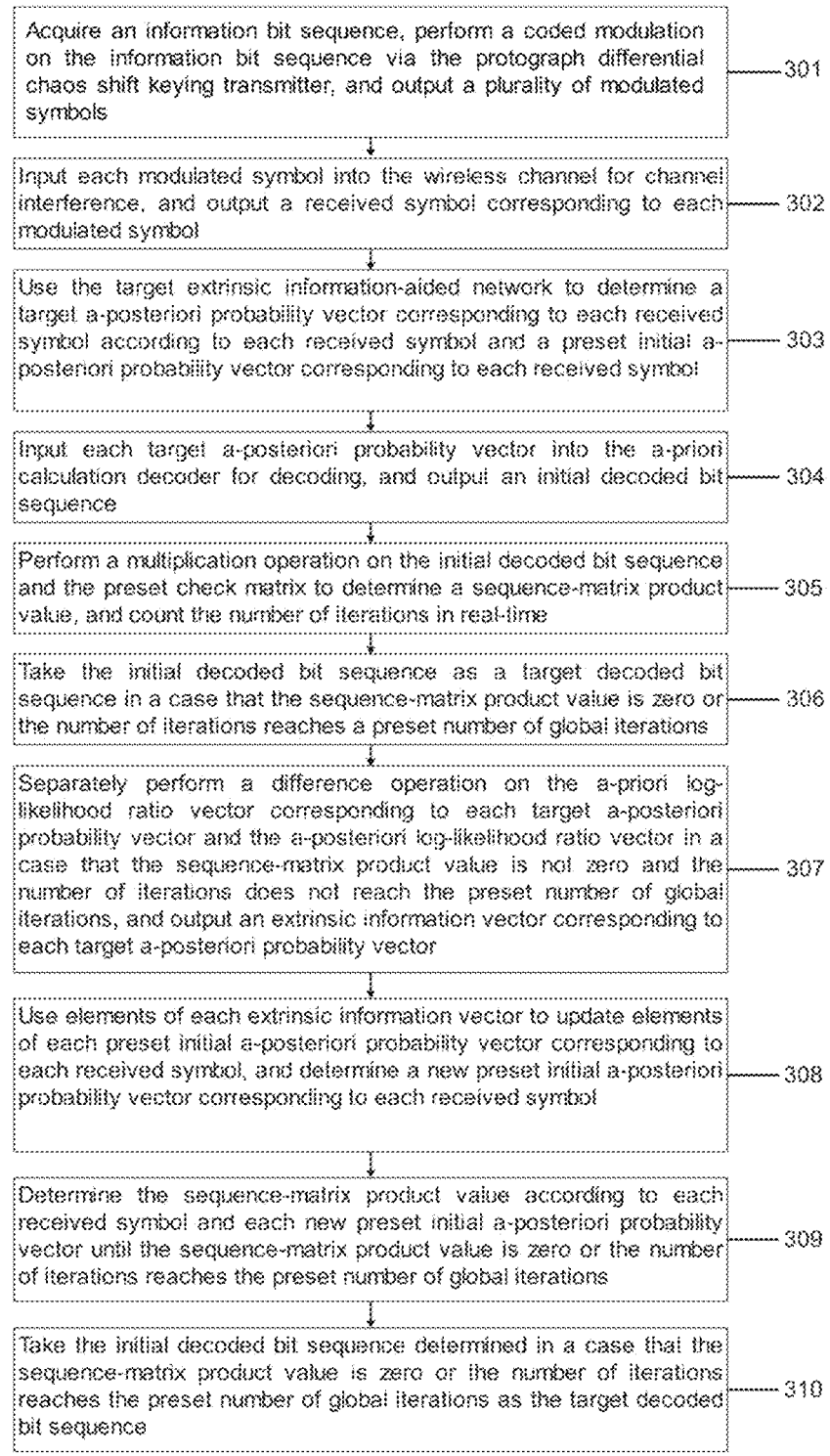
FIG. 3 is another step flowchart of the transceiver decoding method based on protograph DCSK provided in an embodiment of the disclosure.

Referring to FIG. 3, which is another step flowchart of a transceiver decoding method based on protograph DCSK provided in an embodiment of the disclosure.

The disclosure provides a transceiver decoding method based on protograph DCSK. A transceiver includes a protograph DCSK transmitter, a wireless channel, a target extrinsic information-aided network and an a-priori calculation decoder. The method includes the following steps.

Step 301, an information bit sequence is acquired, a coded modulation is performed on the information bit sequence via the protograph DCSK transmitter, and a plurality of modulated M-ary DCSK symbols are outputted.

The protograph DCSK transmitter includes a protograph encoder and an M-ary DCSK modulator.

Furthermore, step 301 can include the following substeps.

S11, the information bit sequence is encoded using the protograph encoder to generate an encoded bit sequence;

S12, the encoded bit sequence is divided according to a preset number of encoded bits, and a plurality of groups of encoded bits are outputted; and S13, each encoded bit is inputted into the M-ary DCSK modulator for modulation to determine the plurality of modulated M-ary DCSK symbols.

It is to be noted that, a given information bit sequence $b=\{b_1, b_2, \ldots, b_K\}$ is acquired and outputted into the protograph encoder to obtain an encoded bit sequence $c=\{c_1, c_2, \ldots, c_K\}$, which is sent to the M-ary DCSK modulator, and the modulated order is defined, that is, the preset modulated order is M, and the preset number of encoded bits $m=\log_2 M$ is obtained, which represents the number of the encoded bits carried by a single M-ary DCSK symbol. In the M-ary DCSK modulator, a chaotic signal generator generates a chaotic sequence $x=\{x_1, x_2, \ldots, x_\beta\}$ with a length of $\beta$, and a Walsh code generator produces an M-order Walsh code, i.e., Walsh code W, according to M. According to the natural mapping rule, the code data $W_u=[w_{u,1}, w_{u,2}, \ldots, w_{u,M}]$ in the $u_{th}$ row of W is selected to participate in the modulation. The modulated M-ary DCSK symbol after modulation is denoted as $\tilde{S}_u=[w_{u,1}x, w_{u,2}x, \ldots, w_{u,M}x]$. The set of the modulated M-ary DCSK symbols composed of modulated M-ary DCSK symbols is represented as $\tilde{S}=\{\tilde{S}_1, \tilde{S}_2, \ldots, \tilde{S}_M\}$. $b_1$ is the first information bit, $b_2$ is the second information bit, and $b_k$ is the $k_{th}$ information bit. $c_1$ is the first encoded bit, $c_2$ is the second encoded bit, and $c_n$ is the $n_{th}$ encoded bit. $x_1$ is the first element in the chaotic sequence, $x_2$ is the second element in the chaotic sequence, and $x_\beta$ is the $\beta_{th}$ element in the chaotic sequence. $\tilde{S}_u$ is the modulated M-ary DCSK symbol, $w_{u,1}$ is the first element in the $u_{th}$ row of the Walsh code, $w_{u,2}$ is the second element in the $u_{th}$ row of the Walsh code, and $w_{u,M}$ is the $M_{th}$ element in the $u_{th}$ row of the Walsh code. $\tilde{S}_1$ is the first modulated M-ary DCSK symbol of the symbol set, $\tilde{S}_2$ is the second modulated M-ary DCSK symbol of the symbol set, and $\tilde{S}_M$ is the $M_{th}$ modulated M-ary DCSK symbol of the symbol set.

In the embodiment, the information bit sequence is acquired, the coded modulation is performed on the information bit sequence via the protograph DCSK transmitter, and a plurality of modulated M-ary DCSK symbols are outputted.

Step 302, each modulated M-ary DCSK symbol is inputted into the wireless channel for channel interference, and a received M-ary DCSK symbol corresponding to each modulated M-ary DCSK symbol is outputted.

In the embodiment, each modulated M-ary DCSK symbol is inputted into the wireless channel for channel interference, and the received M-ary DCSK symbol corresponding to each modulated M-ary DCSK symbol is outputted.

Step 303, the target extrinsic information-aided network is used to determine a target a-posteriori probability vector corresponding to each received M-ary DCSK symbol according to each received M-ary DCSK symbol and a preset initial a-posteriori probability vector corresponding to each received M-ary DCSK symbol.

The target extrinsic information-aided network includes a CNN-LSTM block, an FC block and a decision block.

It is to be noted that the target extrinsic information-aided network provided in the disclosure includes a CNN-LSTM block, an FC block, and a decision block. The CNN-LSTM block includes a buffer (Buffer), a Conv1D layer, a BN layer, a first activation function layer and an LSTM layer, and the first activation function layer employs a rectified linear unit (ReLU) activation function. The FC block includes an FCL, a BN layer and a first activation function layer, and the first activation function layer employs a ReLU activation function. The decision block includes an FCL, a BN layer, a first activation function layer and a second activation function layer, the first activation function layer employs a ReLU activation function, and the second activation function layer employs a Softmax activation function.

Figure 4:
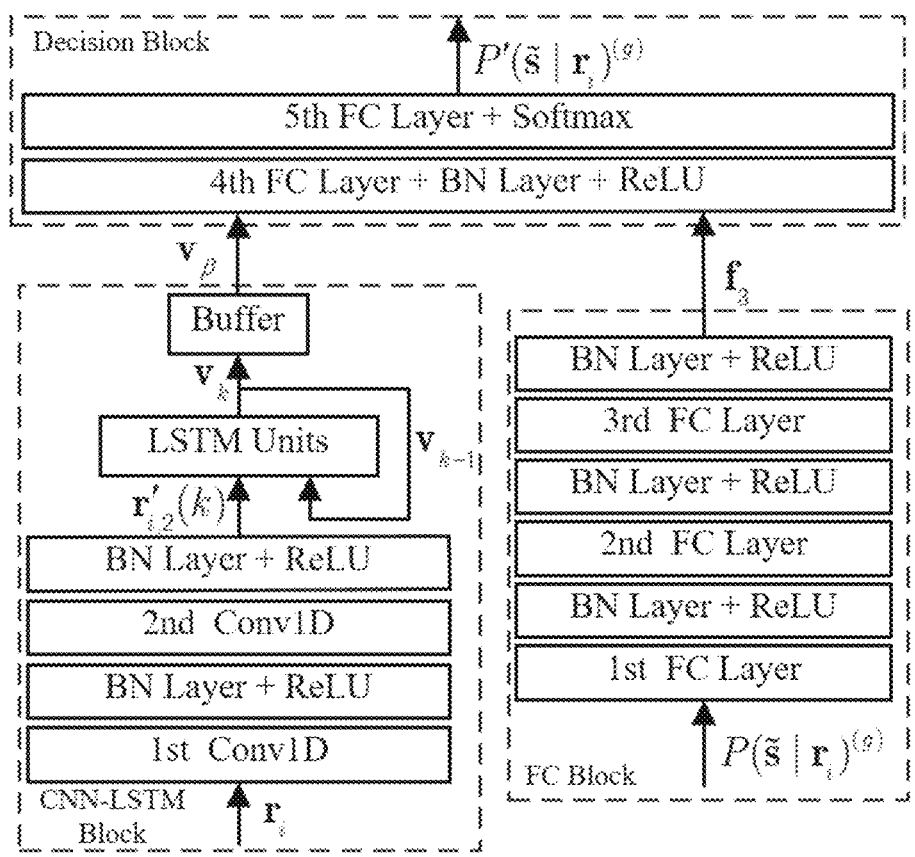
FIG. 4 is a structural schematic diagram of a target extrinsic information-aided network provided in an embodiment of the disclosure.

Specifically, referring to FIG. 4, the target extrinsic information-aided network includes two independent branches, with one branch employing a CNN-LSTM block, which is formed by two layers of Conv1D layers cascaded with an LSTM layer, to extract the correlation features of the chaotic sequence within the received M-ary DCSK symbol, and the other branch utilizing an FC block formed by three layers of FCLs to extract $P(\tilde{S}|r_i)^{(g)}$ that is, to extract the features from the a-posteriori probability vector in a case that the number of global iterations is g. The feature vectors outputted by these two blocks, namely the first feature vector $v_\beta$ and the second feature vector $f_3$, are concatenated and then sent to the decision block formed by two layers of FCLs, to obtain the final network outputs, i.e., the target a-posteriori probability vector. The specific parameters for each layer of the target extrinsic information-aided network are listed in Table 1.

TABLE 1

Parameters of each layer of the target extrinsic information-aided network

| Layer name | Output dimension | Activation function | Other parameters |
| --- | --- | --- | --- |
| Input layer 1 | M × β | None | None |
| Input layer 2 | M | None | None |
| 1st Conv1D | 16 × β | ReLU | Kernel convolution size: 3 Padding size: 1 Step size: 1 |
| 2nd Conv1D | 32 × β | ReLU | Ditto |
| LSTM | 32 | None | None |
| 1st FCL | 32 | ReLU | None |
| 2nd FCL | 64 | ReLU | None |
| 3rd FCL | 200 | ReLU | None |
| 4th FCL | 32 | ReLU | None |
| 5th FCL | M | Softmax | None |

Furthermore, without changing the transmitter, the energy detection-based demodulator in the traditional receiver is replaced by the target extrinsic information-aided network proposed in the disclosure. The target extrinsic information-aided network proposed in the disclosure includes two inputs. The first input is the $i_{th}$ received M-ary DCSK symbol $r_i$, and the second input is the preset initial a-posteriori probability vector $$P(\tilde{S}|r_i)^{(g)} = \left\{ p_{\tilde{S}_1}^{(g)}, p_{\tilde{S}_2}^{(g)}, \ldots, p_{\tilde{S}_M}^{(g)} \right\}$$

corresponding to the received M-ary DCSK symbol in a case that the number of global iterations is g. During the $g_{th}$ global iteration (the number of global iterations), $r_i$ and $P(\tilde{S}|r_i)^{(g)}$ are sent to the target extrinsic information-aided network. In a case that g=0, the preset initial a-posteriori probability vector is denoted as $P(\tilde{S}|r_i)^{(0)}=\{1/M, 1/M, \ldots, 1/M\}$, where $$p_{\tilde{S}_1}^{(g)}$$

is the first element in the preset initial a-posteriori probability vector in a case that the number of global iterations is g, and this element represents an a-posteriori probability of the first modulated M-ary DCSK symbol $\tilde{S}_1$;

$$p_{\tilde{S}_2}^{(g)}$$

is the second element in the preset initial a-posteriori probability vector in a case that the number of global iterations is g, and this element represents an a-posteriori probability of the second modulated M-ary DCSK symbol $\tilde{S}_2$;

$$p_{\tilde{S}_M}^{(g)}$$

is the $M_{th}$ element in the preset initial a-posteriori probability vector in a case that the number of global iterations is g, and this element represents an a-posteriori probability of the $M_{th}$ modulated M-ary DCSK symbol $\tilde{S}_M$; the number of global iterations g=0,1, . . . , I, and I is the maximum number of the global iterations, i.e., the preset number of global iterations.

Alternatively, a training process of the target extrinsic information-aided network can include the following steps.

An information bit sequence to be trained is acquired, a coded modulation is performed on the information bit sequence to be trained via the protograph DCSK transmitter, and a plurality of modulated M-ary DCSK symbols to be trained are outputted.

Each modulated M-ary DCSK symbol to be trained is inputted into the wireless channel for channel interference, and a received M-ary DCSK symbol to be trained corresponding to each modulated M-ary DCSK symbol to be trained is outputted.

An initial a-posteriori probability vector to be trained corresponding to each received M-ary DCSK symbol to be trained is calculated according to each received M-ary DCSK symbol to be trained using a preset LLR calculation method.

On the basis of a preset cross-entropy loss function, network training is performed on an initial extrinsic information-aided network using each received M-ary DCSK symbol to be trained and each initial a-posteriori probability vector to be trained, and a well-trained target extrinsic information-aided network is determined.

It is to be noted that, the transmitter of the protograph DCSK coded modulation system is used to transmit the symbol sequence, after the symbol sequence passing through the channel, the received M-ary DCSK symbol sequence is segmented into individual symbols to be trained; the initial a-posteriori probability vector to be trained corresponding to the received M-ary DCSK symbol to be trained is subjected to the LLR calculation method in the traditional receiver, to calculate the initial a-priori LLR to be trained; and then the initial a-priori LLR to be trained is converted into the initial a-posteriori probability vector to be trained; the corresponding labels for both are index values of the sent symbols (i.e., 1, 2, ..., M), and these labels are encoded into a label vector $l_i = \{l_{i,1}, l_{i,2}, ..., l_{i,M}\}$ using one-hot encoding. In the vector, only the value corresponding to the label is 1, while all other values are 0. $l_{i,1}$ is the first element in the label vector; $l_{i,2}$ is the second element in the label vector; and $l_{i,M}$ is the $M_{th}$ element in the label vector.

Furthermore, in the disclosure, training sets and validation sets are separately generated under different wireless channel conditions and signal-to-noise ratios according to the above-mentioned steps, to perform network training on the initial extrinsic information-aided network. The detailed training hyperparameters are presented in Table 2.

TABLE 2

Training hyperparameters of initial extrinsic information-aided network

| Parameters | Values |
| --- | --- |
| Number of training sets | 500000 |
| Number of validation sets | 100000 |
| Initial learning rate | 0.001 |
| Learning rate strategy | Cosine annealing strategy |
| Optimizer | Adam |
| Number of training epochs | 120 |
| Number of training batches per time | 800 |
| Loss function | Cross-entropy loss function |
| Generation of signal-to-noise ratio of data | 7-25 dB, spacing 1 dB |
| Channel conditions | AWGN, multipath Rayleigh fading channel |

Furthermore, to achieve better performance under different wireless channels, in the disclosure, individual training of data on different wireless channels is performed. A preset cross-entropy loss function is employed to measure the difference between the outputs of the initial extrinsic information-aided network and the labels. Specifically, an initial extrinsic information-aided network is used to determine a target a-posteriori probability vector to be trained corresponding to each received M-ary DCSK symbol to be trained according to each received M-ary DCSK symbol to be trained and each initial a-posteriori probability vector to be trained; the preset cross-entropy loss function is utilized to calculate the target loss value according to the target a-posteriori probability vector to be trained; the target loss value is employed to update the trainable parameters of the initial extrinsic information-aided network, to determine an intermediate extrinsic information-aided network, and the number of network update epochs is counted in real-time. In a case that the number of network update epochs reaches the preset number of training epochs, the intermediate extrinsic information-aided network is used as the well-trained target extrinsic information-aided network. The preset number of training epochs can be set according to specific requirements, and the disclosure is not limited to this. The preset cross-entropy loss function is specifically defined as:

$$\zeta = -\frac{1}{\lambda} \sum_{i=1}^{\lambda} \sum_{k=1}^{M} l_{i,k} \log(p'_{i,\hat{s}_k});$$

where $\zeta$ is the target loss value; $\lambda$ is the number of training batches per time of the received M-ary DCSK symbol and the target a-posteriori probability vector to be trained; M is the preset modulated order; $l_{i,k}$ is the $k_{th}$ element in the label vector;

$$p'_{i,\hat{s}_k}$$

is the $k_{th}$ value in the target a-posteriori probability vector to be trained outputted by the initial extrinsic information-aided network. The network parameters that yield the lowest loss value on the validation set will be utilized for online deployment.

Furthermore, step 303 can include the following sub-steps.

S31, the CNN-LSTM block is used to perform one-dimensional feature extraction on each received M-ary DCSK symbol, and a first feature vector corresponding to each received M-ary DCSK symbol is generated.

The CNN-LSTM block includes a Conv1D layer, a BN layer, a first activation function layer and an LSTM layer.

Furthermore, S31 can include the following sub-steps.

S311, a one-dimensional convolutional operation is performed on each received M-ary DCSK symbol via the Conv1D layer to generate a first convolutional feature corresponding to each received M-ary DCSK symbol.

S312, each first convolutional feature is normalized using the BN layer to determine a first normalized feature corresponding to each first convolutional feature.

S313, each first normalized feature is inputted into the first activation function layer for nonlinear mapping to generate a nonlinear feature corresponding to each first normalized feature.

S314, the one-dimensional convolutional operation is performed on each nonlinear feature via the Conv1D layer to generate a second convolutional feature corresponding to each nonlinear feature.

S315, each second convolutional feature is normalized using the BN layer to determine a second normalized feature corresponding to each second convolutional feature.

S316, each second normalized feature is inputted into the first activation function layer for nonlinear mapping to generate a two-dimensional feature matrix corresponding to each second normalized feature.

S317, column data of each two-dimensional feature matrix are sequentially inputted into the LSTM layer for feature extraction according to a column sequence number of each two-dimensional feature matrix to generate a plurality of initial feature vectors corresponding to each two-dimensional feature matrix.

S318, the plurality of initial feature vectors corresponding to each two-dimensional feature matrix are screened to determine a first feature vector corresponding to each two-dimensional feature matrix.

It is to be noted that, the received M-ary DCSK symbol $r_i$ received by the CNN-LSTM block is first transformed from $1 \times \beta M$ to $M \times \beta$ through size transformation. M and $\beta$ are taken as a channel axis and a time axis for the one-dimensional convolutional operation, respectively. There are $$c_{out}^j$$

convolutional kernels with a size of 3 in the $j_{th}$ layer of the Conv1D layer, and they are outputted as two-dimensional feature matrices $$r'_{i,2}$$

after undergoing two layers of Conv1D layers. Each layer of the Conv1D layer uses ReLU as the activation function. Additionally, a BN layer is added to accelerate training convergence and prevent gradient vanishing. The time axis is represented by the column sequence number of the matrix, and the channel axis is represented by the row sequence number of the matrix. The obtained two-dimensional feature matrices $$r'_{i,2}$$

are inputted into the LSTM layer on a moment-by-moment basis along the time axis, that is, the column data of the two-dimensional feature matrices are sequentially inputted into the LSTM layer for feature extraction according to the column sequence number. For instance, the input at the $k_{th}$ moment, which corresponds to the column data with column sequence number k, can be denoted as $$r'_{i,2}(k) = \left[ x'_{1,k}, x'_{2,k}, \ldots, x'_{c_{out}^j, k} \right], \text{ where } x'_{1,k}$$

is the value at the $k_{th}$ moment in the first channel of $$r'_{i,2}(k), x'_{2,k}$$

is the value at the $k_{th}$ moment in the second channel of $$r'_{i,2}(k), \text{ and } x'_{c_{out}^j, k}$$

is the value at the $k_{th}$ moment in the $$c_{out}^j$$

channel of $$r'_{i,2}(k).$$

At each moment, the LSTM layer outputs a vector, which is stored in a buffer. In the buffer, it is necessary to filter a plurality of initial feature vectors corresponding to each two-dimensional feature matrix to determine the first feature vectors corresponding to each two-dimensional feature matrix, and then the first feature vectors are sent to the decision block. Specifically, during the filtering process, only the vector Ve corresponding to the last time slot is selected as the first feature vector. For example, if one two-dimensional feature matrix has ten columns of column data, after obtaining the vectors corresponding to the ten columns of column data, only the vector corresponding to the tenth column is taken as the first feature vector for output.

S32, the FC block is used to perform vector feature extraction on the preset initial a-posteriori probability vector corresponding to each received M-ary DCSK symbol, and a second feature vector corresponding to each preset initial a-posteriori probability vector is determined.

The FC block includes an FCL, a BN layer and a first activation function layer.

Furthermore, S32 can include the following sub-steps.

S321, feature mapping is performed on the preset initial a-posteriori probability vector corresponding to each received M-ary DCSK symbol via the FCL to generate a first a-posteriori probability mapping feature corresponding to each preset initial a-posteriori probability vector.

S322, normalization and nonlinear mapping are performed on each first a-posteriori probability mapping feature using the BN layer and the first activation function layer, respectively, to determine a first probability nonlinear feature corresponding to each first a-posteriori probability mapping feature.

S323, feature mapping is performed on each first probability nonlinear feature via the FCL to generate a second a-posteriori probability mapping feature corresponding to each first probability nonlinear feature.

S324, normalization and nonlinear mapping are performed on each second a-posteriori probability mapping feature using the BN layer and the first activation function layer, respectively, to determine a second probability nonlinear feature corresponding to each second a-posteriori probability mapping feature.

S325, feature mapping is performed on each second probability nonlinear feature via the FCL to generate a third a-posteriori probability mapping feature corresponding to each second probability nonlinear feature.

S326, normalization and nonlinear mapping are performed on each third a-posteriori probability mapping feature using the BN layer and the first activation function layer, respectively, to determine a second feature vector corresponding to each third a-posteriori probability mapping feature.

It is to be noted that, in the FC block, three layers of FCLs are utilized to extract the features of the preset initial a-posteriori probability vector in the disclosure. ReLU is employed as the activation function among FCLs, and a BN layer is used to accelerate training convergence and prevent gradient vanishing. The output from the third layer of FCL is utilized as the second feature vector $f_3$ and is sent to the decision block.

S33, each first feature vector and each second feature vector are inputted into the decision block for feature concatenating separately, and the target a-posteriori probability vector corresponding to each received M-ary DCSK symbol is outputted.

The decision block includes an FCL, a BN layer, a first activation function layer and a second activation function layer.

Furthermore, S33 can include the following sub-steps.

S331, one-dimensional concatenation is separately performed on each first feature vector and each second feature vector to generate a concatenated feature vector corresponding to each received M-ary DCSK symbol.

S332, feature mapping is performed on each concatenated feature vector via the FCL to determine a first concatenated mapping feature corresponding to each concatenated feature vector.

S333, normalization and nonlinear mapping are performed on each first concatenated mapping feature using the BN layer and the first activation function layer, respectively, to generate a first concatenated nonlinear feature corresponding to each first concatenated mapping feature.

S334, feature mapping is performed on each first concatenated nonlinear feature via the FCL to determine a second concatenated mapping feature corresponding to each first concatenated nonlinear feature.

S335, nonlinear mapping is performed on each second concatenated mapping feature using the second activation function layer to generate a target a-posteriori probability vector corresponding to each second concatenated mapping feature.

It is to be noted that, in the decision block, the disclosure performs one-dimensional concatenation of the two feature vectors, namely the first feature vector and the second feature vector, concatenating them into a concatenated feature vector $f=[v_\beta, f_3]$. The concatenated feature vector is then further processed through two layers of FCLs. After passing through the first layer of FCL, ReLU is used as the activation function, and a BN layer is used to accelerate training convergence and prevent gradient vanishing. After passing through the second layer of FCL, a softmax activation function is employed as the activation function to ensure that the sum of the output vectors from network equals 1.

In the embodiment, the target extrinsic information-aided network is used to determine the target a-posteriori probability vector corresponding to each received M-ary DCSK symbol according to each received M-ary DCSK symbol and the preset initial a-posteriori probability vector corresponding to each received M-ary DCSK symbol.

Step 304, each target a-posteriori probability vector is inputted into the a-priori calculation decoder for decoding, and an initial decoded bit sequence is outputted.

The a-priori calculation decoder includes an a-priori LLR calculation block and a protograph decoder.

Furthermore, step 304 can include the following sub-steps.

S41, a-priori conversion is performed on each target a-posteriori probability vector via the a-priori LLR calculation block to determine an a-priori LLR vector corresponding to each target a-posteriori probability vector.

S42, each a-priori LLR vector is inputted into the protograph decoder for protograph decoding to generate an a-posteriori LLR vector corresponding to each a-priori LLR vector.

S43, hard decision is performed on each a-posteriori LLR vector to generate an initial decoded bit sequence.

It is to be noted that, the above-mentioned target extrinsic information-aided network is used to output a more accurate target a-posteriori probability vector $$P'(\tilde{S}|r_i)^{(g)} = \left\{ p'^{(g)}_{\tilde{S}_1}, p'^{(g)}_{\tilde{S}_2}, \ldots, p'^{(g)}_{\tilde{S}_M} \right\}$$

according to the received M-ary DCSK symbol and the corresponding preset initial a-posteriori probability vector, where $$p'^{(g)}_{\tilde{S}_1}$$

represents the first element in the target a-posteriori probability vector in a case that the number of global iterations is g, and this element represents the a-posteriori probability of the first modulated M-ary DCSK symbol $\tilde{S}_1$ outputted by the target extrinsic information-aided network;

$$p'^{(g)}_{\tilde{S}_2}$$

represents the second element in the target a-posteriori probability vector in a case that the number of global iterations is g, $$p'^{(g)}_{\tilde{S}_M}$$

represents the $M_{th}$ element in the target a-posteriori probability vector in a case that the number of global iterations is g; and $P'(\tilde{S}|r_i)^{(g)}$ is the target a-posteriori probability vector in a case that the number of global iterations is g.

Furthermore, the target a-posteriori probability vector is converted into an a-priori LLR vector via the a-priori LLR calculation block, the a-priori LLR vector is sent to the protograph decoder to obtain an a-posteriori LLR vector, and after performing hard decision on the a-posteriori LLR vector, an initial decoded bit sequence $\tilde{b}_g$ in a case that the number of global iterations is g is obtained.

In the embodiment, each target a-posteriori probability vector is inputted into the a-priori calculation decoder for decoding, and an initial decoded bit sequence is outputted.

Step 305, a multiplication operation is performed on the initial decoded bit sequence and the preset check matrix to determine a sequence-matrix product value, and the number of iterations is counted in real-time.

It is to be noted that, a check matrix of the protograph code is defined, that is, the preset check matrix is H, and the multiplication operation is performed on the initial decoded bit sequence and the preset check matrix to determine the sequence-matrix product value.

In the embodiment, the multiplication operation is performed on the initial decoded bit sequence and the preset check matrix to determine the sequence-matrix product value, and the number of iterations is counted in real-time.

Step 306, the initial decoded bit sequence is taken as a target decoded bit sequence in a case that the sequence-matrix product value is zero or the number of iterations reaches the preset number of global iterations.

It is to be noted that, if $\tilde{b}_g \cdot H = 0$, that is, the sequence-matrix product value $\tilde{b}_g \cdot H$ is 0, or g=I, that is, the number of iterations reaches the preset maximum number of global iterations, the iteration on the preset initial a-posteriori probability vector is stopped, and the initial decoded bit sequence is taken as the target decoded bit sequence, that is, $\tilde{b} = \tilde{b}_g$, where $\tilde{b}$ is the target decoded bit sequence.

In the embodiment, the initial decoded bit sequence is taken as the target decoded bit sequence in a case that the sequence-matrix product value is zero or the number of iterations reaches the preset number of global iterations.

Step 307, a difference operation is separately performed on each a-priori LLR vector corresponding to each target a-posteriori probability vector and each a-posteriori LLR vector in a case that the sequence-matrix product value is not zero and the number of iterations does not reach the preset number of global iterations, and an extrinsic information vector corresponding to each target a-posteriori probability vector is outputted.

It is to be noted that, if the sequence-matrix product value is not zero and the number of iterations does not reach the preset maximum number of global iterations, the extrinsic information $$L^{(g)}_{E,Dec} = L^{(g)}_{P,Dec} - L^{(g)}_{A,Dec}$$

outputted by the decoder is taken as the input of the target extrinsic information-aided network to perform global iterations on the inputted preset initial a-posteriori probability vector. In other words, updating and iteration are performed on the preset initial a-posteriori probability vector.

In the embodiment, the difference operation is separately performed on each a-priori LLR vector corresponding to each target a-posteriori probability vector and each a-posteriori LLR vector in a case that the sequence-matrix product value is not zero and the number of iterations does not reach the preset number of global iterations, and the extrinsic information vector corresponding to each target a-posteriori probability vector is outputted.

Step 308, elements of each extrinsic information vector are used to update elements of the preset initial a-posteriori probability vector corresponding to each received M-ary DCSK symbol, and a new preset initial a-posteriori probability vector corresponding to each received M-ary DCSK symbol is determined.

In the embodiment, elements of each extrinsic information vector are used to update elements of the preset initial a-posteriori probability vector corresponding to each received M-ary DCSK symbol, and the new preset initial a-posteriori probability vector corresponding to each received M-ary DCSK symbol is determined.

Step 309, the sequence-matrix product value is determined according to each received M-ary DCSK symbol and each new preset initial a-posteriori probability vector until the sequence-matrix product value is zero or the number of iterations reaches the preset number of global iterations.

In the embodiment, the sequence-matrix product value is determined according to each received M-ary DCSK symbol and each new preset initial a-posteriori probability vector until the sequence-matrix product value is zero or the number of iterations reaches the preset number of global iterations.

Step 310, the initial decoded bit sequence determined in a case that the sequence-matrix product value is zero or the number of iterations reaches the preset number of global iterations is taken as the target decoded bit sequence.

Figure 5:
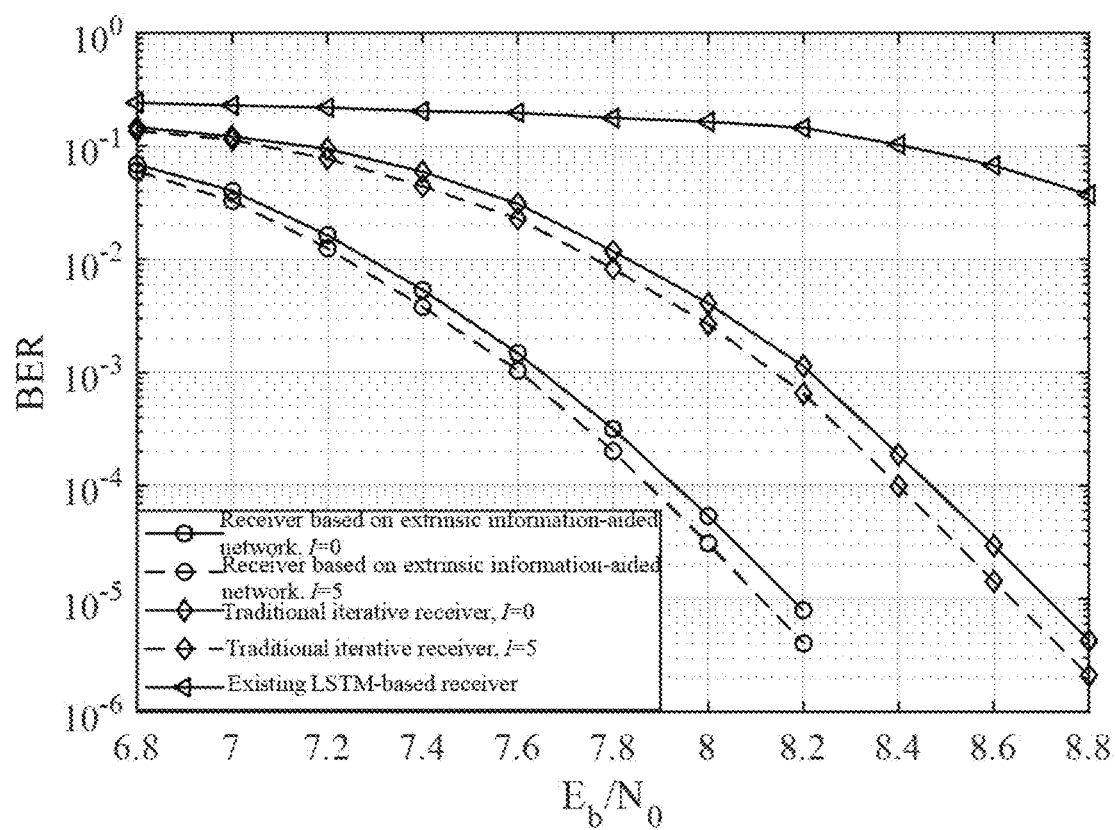
FIG. 5 is a schematic diagram showing bit error rate (BER) of an extrinsic information receiver, a traditional iterative receiver and an existing LSTM-based receiver under an additive white Gaussian noise (AWGN) channel, provided in an embodiment of the disclosure.
Figure 6:
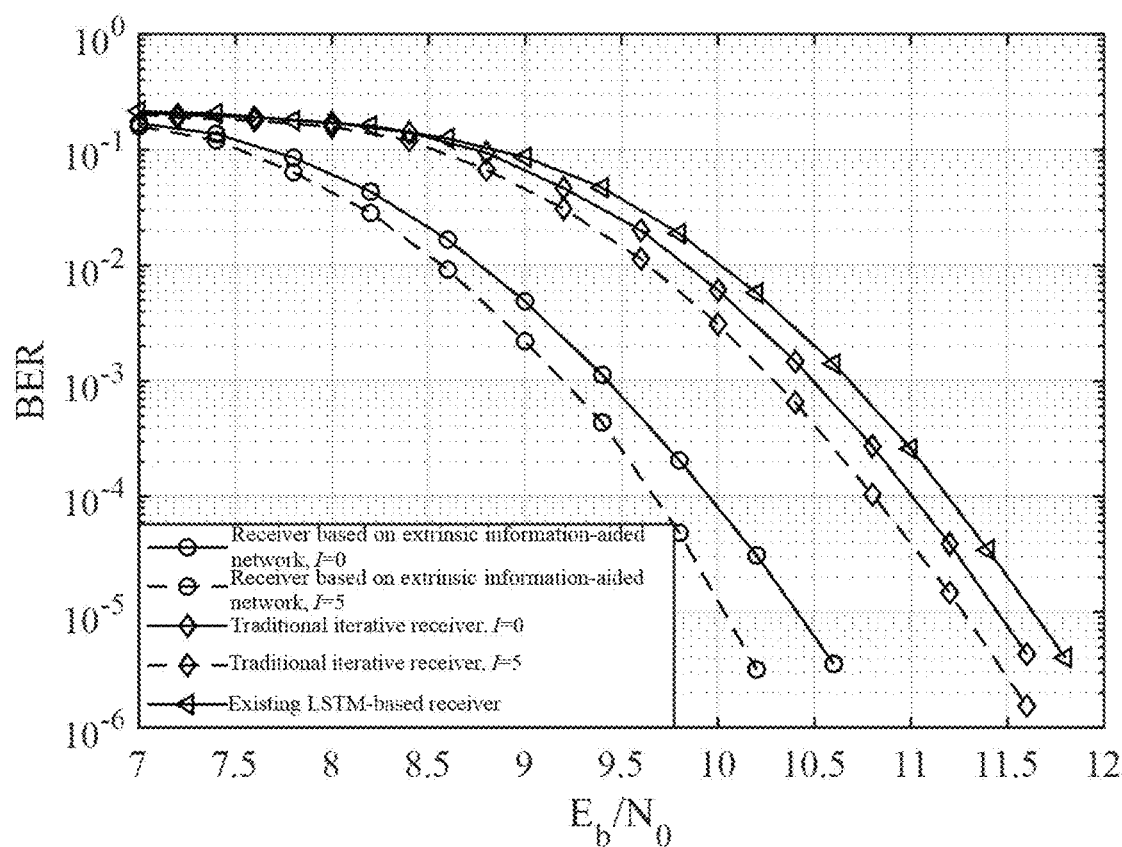
FIG. 6 is a schematic diagram showing BER of the extrinsic information receiver, the traditional iterative receiver and the existing LSTM-based receiver under the multipath Rayleigh fading channel, provided in an embodiment of the disclosure.

It is to be noted that, referring to FIG. 5 and FIG. 6, under the conditions that M=16 and β=20, the disclosure conducts a BER analysis on the AR4JA protograph code with a code rate of 1/2 with different receivers. The length of the AR4JA code is set to 600, and the decoder employs the Belief Propagation (BP) algorithm with 50 iterations. The channel models considered are AWGN channel and multipath Rayleigh fading channel. The simulation results are as shown in FIG. 5 and FIG. 6. Whether the channel is AWGN or multipath Rayleigh fading, the provided receiver based on the target extrinsic information-aided network, i.e., the extrinsic information receiver in the disclosure, has a significant BER performance advantage compared to traditional iterative receivers or existing deep learning-based receivers.

In the embodiment, the initial decoded bit sequence determined in a case that the sequence-matrix product value is zero or the number of iterations reaches the preset number of global iterations is taken as the target decoded bit sequence.

Figure 7:
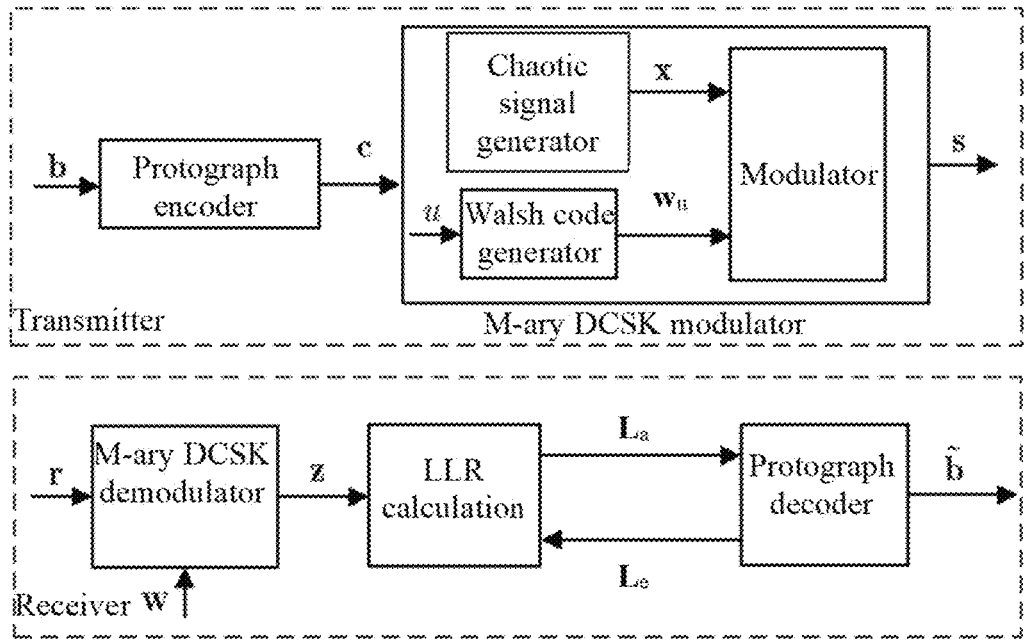
FIG. 7 is a structural schematic diagram of a traditional transceiver of a protograph DCSK coded modulation system provided in an embodiment of the disclosure.

For the purpose of technical effect comparison, reference can be made to prior art. Referring to FIG. 7, the transceiver of the existing protograph DCSK coded modulation system, after obtaining the received M-ary DCSK symbol, sends the received M-ary DCSK symbol into an M-ary DCSK demodulator for energy detection, and an observation vector $z=[z_1, z_2, \ldots, z_M]$ is generated, which can be specifically expressed as:

$$z_u = \sum_{j=1}^{\beta} \left( \sum_{k=1}^{M} w_{u,k} r_k \right);$$

where $z_u$ is the $u_{th}$ element in the observation vector; β is the length of a single chaotic sequence; M is the preset modulated order; $w_{u,k}$ is the $k_{th}$ element in the $u_{th}$ row of the Walsh code; $r_k$ is the $k_{th}$ chaotic sequence in the received signals, $r_k=[r_{k,1}, r_{k,2}, \ldots, r_{k,\beta}]$, where $r_{k,1}$ is the first value in the $k_{th}$ chaotic sequence of the received signals, $r_{k,2}$ is the second value in the $k_{th}$ chaotic sequence of the received signals, and $r_{k,\beta}$ is the $k_{th}$ value in the $k_{th}$ chaotic sequence of the received signals.

Furthermore, the a-priori LLR $L_\alpha$ is calculated using the observation vector. Subsequently, the protograph decoder utilizes the LLR for decoding (i.e., performing inner iterations) to obtain the decoded bit $\tilde{b}$. The decoder can feed back the extrinsic information (i.e., $L_e$) to assist in the calculation of $L_a$ (i.e., performing global iterations), thereby achieving iterative receiving.

On the above basis, all existing deep learning-based receivers designed for DCSK systems have not considered coded DCSK systems, that is, there is no deep learning-based receiver designed specifically for the protograph DCSK coded modulation systems. For instance, existing receivers based on the LSTM network are designed for orthogonal frequency division multiplexing DCSK (OFDM-DCSK) systems, failing to consider the characteristics of protograph DCSK coded modulation systems. The above-mentioned traditional iterative receiver for the protograph DCSK coded modulation system primarily has two major drawbacks. First, the demodulator employs energy detection as symbol detection, focusing solely on the energy characteristic of the received chaotic sequences, failing to utilize the correlation features that exist between the chaotic sequences, thereby affecting the performance of the system. Second, in a case of calculating the a-priori LLR, the traditional receiver requires the channel fading factor or the average energy gain of the transmission path, restricting the application of the protograph DCSK coded modulation system. In contrast, the above-mentioned deep learning-based receiver primarily has the drawback that it is not specifically designed for coded DCSK systems, failing to utilize the extrinsic information outputted by the decoder for global iterations, which affects the performance of the protograph DCSK coded modulation systems.

In summary, to enhance the transmission reliability of the protograph DCSK coded modulation system, the disclosure provides a transceiver decoding method based on protograph DCSK, employing an extrinsic-information network-aided iterative decoding receiver (EICNet-ID receiver) for the protograph DCSK coded modulation system to improve the traditional iterative receivers and addressing the problem of existing deep learning-based receivers being unable to utilize extrinsic information for global iterations. Specifically, targeting the shortcomings of traditional iterative receivers for protograph DCSK coded modulation systems, which fail to utilize the correlation features between chaotic sequences and require channel state information for calculating a-priori LLRs, as well as the limitation of existing deep learning-based receivers in being unable to utilize extrinsic information, the provided target extrinsic information-aided network in the disclosure can utilize the correlation features between chaotic sequences, enabling more accurate a-priori LLRs without the need for channel information, thereby enhancing the reliability of the protograph DCSK coded modulation system. In addition, the provided target extrinsic information-aided network considers both the received M-ary DCSK symbol and its corresponding a-posteriori probability, allowing the network to utilize the extrinsic information fed back from the protograph decoder to update the input of the network, thereby further enhancing the reliability of the system and enabling iterative receiving, and the reliability of the system is significantly improved. Meanwhile, by enhancing the accuracy of the a-priori LLR, the error performance of the system is improved. Furthermore, the extrinsic information outputted by the decoder can be used for global iterations, to further improve the error performance. Comparing with the existing deep-learning based receiver, the structure of the target extrinsic information-aided network proposed in the disclosure can utilize the correlation features between chaotic sequences as well as the extrinsic information outputted by the decoder, which is not considered in existing deep-learning based receiver, and the provided extrinsic information receiver has significant performance advantages over existing receivers.

In an embodiment of the disclosure, a transceiver decoding method based on protograph DCSK is provided. First, an information bit sequence is acquired, a coded modulation is performed on the information bit sequence via a protograph DCSK transmitter, and a plurality of modulated M-ary DCSK symbols are outputted; then, each modulated M-ary DCSK symbol is inputted into a wireless channel for channel interference, and a received M-ary DCSK symbol corresponding to each modulated M-ary DCSK symbol is outputted; a target extrinsic information-aided network is used to determine a target a-posteriori probability vector corresponding to each received M-ary DCSK symbol according to each received M-ary DCSK symbol and a preset initial a-posteriori probability vector corresponding to each received M-ary DCSK symbol; each target a-posteriori probability vector is inputted into an a-priori calculation decoder for decoding, and an initial decoded bit sequence is outputted; and finally, a target decoded bit sequence is determined according to the initial decoded bit sequence and a preset check matrix. According to the above-mentioned solutions, in the process of generating the target decoded bit sequence on the basis of the initial decoded bit sequence determined by the target extrinsic information-aided network and the preset check matrix, both the received M-ary DCSK symbol and a-posteriori probability vector corresponding thereto are considered, thereby improving the performance of a protograph DCSK coded modulation system, and further improving the decoding accuracy.

Figure 8:
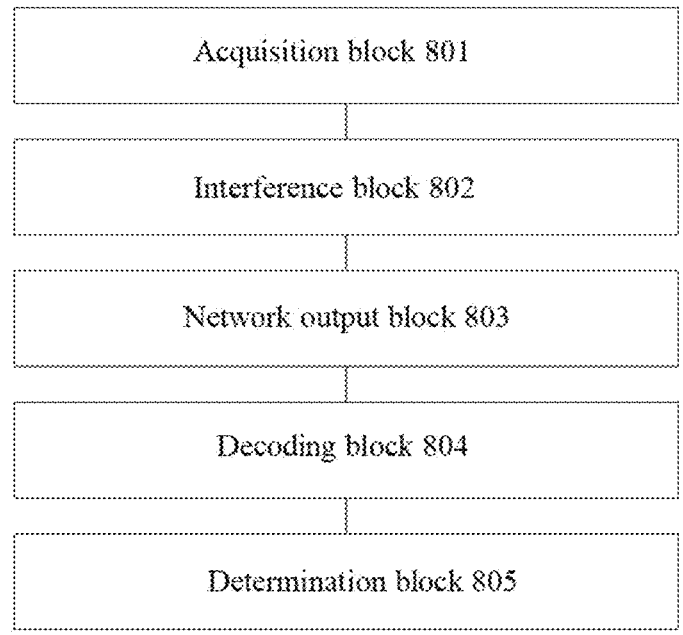
FIG. 8 is a block diagram of a transceiver decoding system based on protograph DCSK provided in an embodiment of the disclosure.

Referring to FIG. 8, which is a block diagram of a transceiver decoding system based on protograph DCSK provided in an embodiment of the disclosure.

The disclosure provides a transceiver decoding system based on protograph DCSK. A transceiver includes a protograph DCSK transmitter, a wireless channel, a target extrinsic information-aided network and an a-priori calculation decoder. The system includes:

an acquisition block 801, configured to acquire an information bit sequence, perform a coded modulation on the information bit sequence via the protograph DCSK transmitter, and output a plurality of modulated M-ary DCSK symbols;

an interference block 802, configured to input each modulated M-ary DCSK symbol into the wireless channel for channel interference, and output a received M-ary DCSK symbol corresponding to each modulated M-ary DCSK symbol;

a network output block 803, configured to use the target extrinsic information-aided network to determine a target a-posteriori probability vector corresponding to each received M-ary DCSK symbol according to each received M-ary DCSK symbol and a preset initial a-posteriori probability vector corresponding to each received M-ary DCSK symbol;

a decoding block 804, configured to input each target a-posteriori probability vector into the a-priori calculation decoder for decoding, and output an initial decoded bit sequence; and a determination block 805, configured to determine a target decoded bit sequence according to the initial decoded bit sequence and a preset check matrix.

Furthermore, the protograph DCSK transmitter includes a protograph encoder and an M-ary DCSK modulator. The acquisition block 801 is specifically configured to:

encode the information bit sequence using the protograph encoder to generate an encoded bit sequence;

divide the encoded bit sequence according to a preset number of encoded bits, and output a plurality of groups of encoded bits; and input each encoded bit into the M-ary DCSK modulator for modulation to determine the plurality of modulated M-ary DCSK symbols.

Furthermore, the target extrinsic information-aided network includes a CNN-LSTM block, an FC block and a decision block; and the network output block 803 includes:

a first sub-block, configured to use the CNN-LSTM block to perform one-dimensional feature extraction on each received M-ary DCSK symbol, and generate a first feature vector corresponding to each received M-ary DCSK symbol;

a second sub-block, configured to use the FC block to perform vector feature extraction on the preset initial a-posteriori probability vector corresponding to each received M-ary DCSK symbol, and determine a second feature vector corresponding to each preset initial a-posteriori probability vector; and a third sub-block, configured to input each first feature vector and each second feature vector into the decision block for feature concatenating separately, and output the target a-posteriori probability vector corresponding to each received M-ary DCSK symbol.

Furthermore, the CNN-LSTM block includes a Conv1D layer, a BN layer, a first activation function layer and an LSTM layer; and the first sub-block is specifically configured to:

perform a one-dimensional convolutional operation on each received M-ary DCSK symbol via the Conv1D layer to generate a first convolutional feature corresponding to each received M-ary DCSK symbol;

normalize each first convolutional feature using the BN layer to determine a first normalized feature corresponding to each first convolutional feature;

input each first normalized feature into the first activation function layer for nonlinear mapping to generate a nonlinear feature corresponding to each first normalized feature;

perform the one-dimensional convolutional operation on each nonlinear feature via the Conv1D layer to generate a second convolutional feature corresponding to each nonlinear feature;

normalize each second convolutional feature using the BN layer to determine a second normalized feature corresponding to each second convolutional feature;

input each second normalized feature into the first activation function layer for nonlinear mapping to generate a two-dimensional feature matrix corresponding to each second normalized feature;

sequentially input column data of each two-dimensional feature matrix into the LSTM layer for feature extraction according to a column sequence number of each two-dimensional feature matrix to generate a plurality of initial feature vectors corresponding to each two-dimensional feature matrix; and screen the plurality of initial feature vectors corresponding to each two-dimensional feature matrix to determine a first feature vector corresponding to each two-dimensional feature matrix.

Furthermore, the FC block includes an FCL, a BN layer and a first activation function layer; and the second sub-block is specifically configured to:

perform feature mapping on the preset initial a-posteriori probability vector corresponding to each received M-ary DCSK symbol via the FCL to generate a first a-posteriori probability mapping feature corresponding to each preset initial a-posteriori probability vector;

perform normalization and nonlinear mapping on each first a-posteriori probability mapping feature using the BN layer and the first activation function layer, respectively, to determine a first probability nonlinear feature corresponding to each first a-posteriori probability mapping feature;

perform feature mapping on each first probability nonlinear feature via the FCL to generate a second a-posteriori probability mapping feature corresponding to each first probability nonlinear feature;

perform normalization and nonlinear mapping on each second a-posteriori probability mapping feature using the BN layer and the first activation function layer, respectively, to determine a second probability nonlinear feature corresponding to each second a-posteriori probability mapping feature;

perform feature mapping on each second probability nonlinear feature via the FCL to generate a third a-posteriori probability mapping feature corresponding to each second probability nonlinear feature; and perform normalization and nonlinear mapping on each third a-posteriori probability mapping feature using the BN layer and the first activation function layer, respectively, to determine a second feature vector corresponding to each third a-posteriori probability mapping feature.

Furthermore, the decision block includes an FCL, a BN layer, a first activation function layer and a second activation function layer; and the third sub-block is specifically configured to:

separately perform one-dimensional concatenation on each first feature vector and each second feature vector to generate a concatenated feature vector corresponding to each received M-ary DCSK symbol;

perform feature mapping on each concatenated feature vector via the FCL to determine a first concatenated mapping feature corresponding to each concatenated feature vector;

perform normalization and nonlinear mapping on each first concatenated mapping feature using the BN layer and the first activation function layer, respectively, to generate a first concatenated nonlinear feature corresponding to each first concatenated mapping feature;

perform feature mapping on each first concatenated nonlinear feature via the FCL to determine a second concatenated mapping feature corresponding to each first concatenated nonlinear feature; and perform nonlinear mapping on each second concatenated mapping feature using the second activation function layer to generate a target a-posteriori probability vector corresponding to each second concatenated mapping feature.

Furthermore, the a-priori calculation decoder includes an a-priori LLR calculation block and a protograph decoder; and the decoding block 804 is specifically configured to:

perform a-priori conversion on each target a-posteriori probability vector via the a-priori LLR calculation block to determine an a-priori LLR vector corresponding to each target a-posteriori probability vector;

input each a-priori LLR vector into the protograph decoder for protograph decoding to generate an a-posteriori LLR vector corresponding to each a-priori LLR vector; and perform hard decision on each a-posteriori LLR vector to generate an initial decoded bit sequence.

Furthermore, the determination block 805 is specifically configured to:
perform a multiplication operation on the initial decoded bit sequence and the preset check matrix to determine a sequence-matrix product value, and count the number of iterations in real-time;
take the initial decoded bit sequence as a target decoded bit sequence in a case that the sequence-matrix product value is zero or the number of iterations reaches the preset number of global iterations;
separately perform a difference operation on each a-priori LLR vector corresponding to each target a-posteriori probability vector and each a-posteriori LLR vector in a case that the sequence-matrix product value is not zero and the number of iterations does not reach the preset number of global iterations, and output an extrinsic information vector corresponding to each target a-posteriori probability vector;
use elements of each extrinsic information vector to update elements of each preset initial a-posteriori probability vector corresponding to each received M-ary DCSK symbol, and determine a new preset initial a-posteriori probability vector corresponding to each received M-ary DCSK symbol;
determine the sequence-matrix product value according to each received M-ary DCSK symbol and each new preset initial a-posteriori probability vector until the sequence-matrix product value is zero or the number of iterations reaches the preset number of global iterations; and
take the initial decoded bit sequence determined in a case that the sequence-matrix product value is zero or the number of iterations reaches the preset number of global iterations as the target decoded bit sequence.

In an alternative embodiment, the system further includes:
a first block, configured to acquire an information bit sequence to be trained, perform a coded modulation on the information bit sequence to be trained via the protograph DCSK transmitter, and output a plurality of modulated M-ary DCSK symbols to be trained;
a second block, configured to input each modulated M-ary DCSK symbol to be trained into the wireless channel for channel interference, and output a received M-ary DCSK symbol to be trained corresponding to each modulated M-ary DCSK symbol to be trained;
a third block, configured to calculate an initial a-posteriori probability vector to be trained corresponding to each received M-ary DCSK symbol to be trained using a preset LLR calculation method according to each received M-ary DCSK symbol to be trained; and
a fourth block, configured to, on the basis of a preset cross-entropy loss function, perform network training on an initial extrinsic information-aided network using each received M-ary DCSK symbol to be trained and each initial a-posteriori probability vector to be trained, and determine a well-trained target extrinsic information-aided network.

A person skilled in the art will readily appreciate that, for brevity and conciseness in description, the specific operation process of the system, block, and sub-block described above can be referred to the corresponding process in the embodiments of the method mentioned above, which is hereby omitted.

In the several embodiments provided in the present application, it is to be understood that the system and method disclosed can be realized in other ways. For example, the above-described embodiments of the system are merely schematic, and the division of the unit is merely a logical functional division, which can be actually realized in a different way. For example, a plurality of units or components can be combined or can be integrated into another system, or some features can be ignored, or not implemented. At another point, the mutual coupling, direct coupling, or communication connection shown or discussed can be an indirect coupling or communication connection through some interfaces devices or units, and can be electrical, mechanical or otherwise.

The units described as illustrated as separated components can or cannot be physically separated, and the components shown as units can or cannot be physical units, i.e., they can be located in a single place or can also be distributed to a plurality of network units. Some or all of these units can be selected to fulfill the purpose of the solution of the embodiment according to actual needs.

The embodiments described above are merely used for illustrating the technical solutions of the disclosure, rather than limiting the disclosure. Although the disclosure is described in detail by reference to the foregoing embodiments, it is to be understood by those ordinary skilled in the art that the technical solutions set forth in each embodiment can still be modified or some technical features can be replaced equivalently, and those modifications or replacements cannot make the essence of the corresponding technical solutions out of the spirit and scope of the technical solutions in each embodiment of the disclosure.

The invention claimed is:

1. A transceiver decoding method based on protograph differential chaos shift keying, a transceiver comprising a protograph differential chaos shift keying transmitter, a wireless channel, a target extrinsic information-aided network and an a-priori calculation decoder, wherein the method comprises:
acquiring an information bit sequence, performing a coded modulation on the information bit sequence via the protograph differential chaos shift keying transmitter, and outputting a plurality of modulated symbols;
inputting each modulated symbol into the wireless channel for channel interference, and outputting a received symbol corresponding to each modulated symbol;
using the target extrinsic information-aided network to determine a target a-posteriori probability vector corresponding to each received symbol according to each received symbol and a preset initial a-posteriori probability vector corresponding to each received symbol;
inputting each target a-posteriori probability vector into the a-priori calculation decoder for decoding, and outputting an initial decoded bit sequence; and
determining a target decoded bit sequence according to the initial decoded bit sequence and a preset check matrix; and
the target extrinsic information-aided network comprises a convolutional neural network-long short-term memory block, a fully connected block, and a decision block; and the step of using the target extrinsic information-aided network to determine a target a-posteriori probability vector corresponding to each received symbol according to each received symbol and a preset initial a-posteriori probability vector corresponding to each received symbol comprises:
using the convolutional neural network-long short-term memory block to perform one-dimensional feature extraction on each received symbol, and generating a first feature vector corresponding to each received symbol;

using the fully connected block to perform vector feature extraction on the preset initial a-posteriori probability vector corresponding to each received symbol, and determining a second feature vector corresponding to each preset initial a-posteriori probability vector; and inputting each first feature vector and each second feature vector into the decision block for feature concatenating separately, and outputting the target a-posteriori probability vector corresponding to each received symbol.

2. The transceiver decoding method based on protograph differential chaos shift keying according to claim 1, wherein the protograph differential chaos shift keying transmitter comprises a protograph encoder and an M-ary differential chaos shift keying modulator; and the step of performing a coded modulation on the information bit sequence via the protograph differential chaos shift keying transmitter, and outputting a plurality of modulated symbols comprises:

encoding the information bit sequence using the protograph encoder to generate an encoded bit sequence;

dividing the encoded bit sequence according to a preset number of encoded bits, and outputting a plurality of groups of encoded bits; and inputting each encoded bit into the M-ary differential chaos shift keying modulator for modulation to determine the plurality of modulated symbols.

3. The transceiver decoding method based on protograph differential chaos shift keying according to claim 1, wherein the convolutional neural network-long short-term memory block comprises a one-dimensional convolutional layer, a batch normalized layer, a first activation function layer and a long short-term memory layer; and the step of using the convolutional neural network-long short-term memory block to perform one-dimensional feature extraction on each received symbol, and generating a first feature vector corresponding to each received symbol comprises:

performing a one-dimensional convolutional operation on each received symbol via the one-dimensional convolutional layer to generate a first convolutional feature corresponding to each received symbol;

normalizing each first convolutional feature using the batch normalized layer to determine a first normalized feature corresponding to each first convolutional feature;

inputting each first normalized feature into the first activation function layer for nonlinear mapping to generate a nonlinear feature corresponding to each first normalized feature;

performing the one-dimensional convolutional operation on each nonlinear feature via the one-dimensional convolutional layer to generate a second convolutional feature corresponding to each nonlinear feature;

normalizing each second convolutional feature using the batch normalized layer to determine a second normalized feature corresponding to each second convolutional feature;

inputting each second normalized feature into the first activation function layer for nonlinear mapping to generate a two-dimensional feature matrix corresponding to each second normalized feature;

sequentially inputting column data of each two-dimensional feature matrix into the long short-term memory layer for feature extraction according to a column sequence number of each two-dimensional feature matrix to generate a plurality of initial feature vectors corresponding to each two-dimensional feature matrix; and screening the plurality of initial feature vectors corresponding to each two-dimensional feature matrix to determine a first feature vector corresponding to each two-dimensional feature matrix.

4. The transceiver decoding method based on protograph differential chaos shift keying according to claim 1, wherein the fully connected block comprises a fully connected layer, a batch normalized layer and a first activation function layer; and the step of using the fully connected block to perform vector feature extraction on the preset initial a-posteriori probability vector corresponding to each received symbol, and determining a second feature vector corresponding to each preset initial a-posteriori probability vector comprises:

performing feature mapping on the preset initial a-posteriori probability vector corresponding to each received symbol via the fully connected layer to generate a first a-posteriori probability mapping feature corresponding to each preset initial a-posteriori probability vector;

performing normalization and nonlinear mapping on each first a-posteriori probability mapping feature using the batch normalized layer and the first activation function layer, respectively, to determine a first probability nonlinear feature corresponding to each first a-posteriori probability mapping feature;

performing feature mapping on each first probability nonlinear feature via the fully connected layer to generate a second a-posteriori probability mapping feature corresponding to each first probability nonlinear feature;

performing normalization and nonlinear mapping on each second a-posteriori probability mapping feature using the batch normalized layer and the first activation function layer, respectively, to determine a second probability nonlinear feature corresponding to each second a-posteriori probability mapping feature;

performing feature mapping on each second probability nonlinear feature via the fully connected layer to generate a third a-posteriori probability mapping feature corresponding to each second probability nonlinear feature; and performing normalization and nonlinear mapping on each third a-posteriori probability mapping feature using the batch normalized layer and the first activation function layer, respectively, to determine a second feature vector corresponding to each third a-posteriori probability mapping feature.

5. The transceiver decoding method based on protograph differential chaos shift keying according to claim 1, wherein the decision block comprises a fully connected layer, a batch normalized layer, a first activation function layer and a second activation function layer; and the step of inputting each first feature vector and each second feature vector into the decision block for feature concatenating separately, and outputting the target a-posteriori probability vector corresponding to each received symbol comprises:

separately performing one-dimensional concatenation on each first feature vector and each second feature vector to generate a concatenated feature vector corresponding to each received symbol;

performing feature mapping on each concatenated feature vector via the fully connected layer to determine a first concatenated mapping feature corresponding to each concatenated feature vector;

performing normalization and nonlinear mapping on each first concatenated mapping feature using the batch normalized layer and the first activation function layer, respectively, to generate a first concatenated nonlinear feature corresponding to each first concatenated mapping feature;

performing feature mapping on each first concatenated nonlinear feature via the fully connected layer to determine a second concatenated mapping feature corresponding to each first concatenated nonlinear feature; and performing nonlinear mapping on each second concatenated mapping feature using the second activation function layer to generate a target a-posteriori probability vector corresponding to each second concatenated mapping feature.

6. The transceiver decoding method based on protograph differential chaos shift keying according to claim 1, wherein the a-priori calculation decoder comprises an a-priori log-likelihood ratio calculation block and a protograph decoder; and the step of inputting each target a-posteriori probability vector into the a-priori calculation decoder for decoding, and outputting an initial decoded bit sequence comprises:

performing a-priori conversion on each target a-posteriori probability vector via the a-priori log-likelihood ratio calculation block to determine an a-priori log-likelihood ratio vector corresponding to each target a-posteriori probability vector;

inputting each a-priori log-likelihood ratio vector into the protograph decoder for protograph decoding to generate an a-posteriori log-likelihood ratio vector corresponding to each a-priori log-likelihood ratio vector; and performing hard decision on each a-posteriori log-likelihood ratio vector to generate an initial decoded bit sequence.

7. The transceiver decoding method based on protograph differential chaos shift keying according to claim 6, wherein the step of determining a target decoded bit sequence according to the initial decoded bit sequence and a preset check matrix comprises:

performing a multiplication operation on the initial decoded bit sequence and the preset check matrix to determine a sequence-matrix product value, and counting the number of iterations in real-time;

taking the initial decoded bit sequence as a target decoded bit sequence in a case that the sequence-matrix product value is zero or the number of iterations reaches a preset number of global iterations;

separately performing a difference operation on the a-priori log-likelihood ratio vector corresponding to each target a-posteriori probability vector and the a-posteriori log-likelihood ratio vectors in a case that the sequence-matrix product value is not zero and the number of iterations does not reach the preset number of global iterations, and outputting an extrinsic information vector corresponding to each target a-posteriori probability vector;

using elements of each extrinsic information vector to update elements of the preset initial a-posteriori probability vector corresponding to each received symbol, and determining a new preset initial a-posteriori probability vector corresponding to each received symbol;

determining the sequence-matrix product value according to each received symbol and each new preset initial a-posteriori probability vector until the sequence-matrix product value is zero or the number of iterations reaches the preset number of global iterations; and taking the initial decoded bit sequence determined in a case that the sequence-matrix product value is zero or the number of iterations reaches the preset number of global iterations as the target decoded bit sequence.

8. The transceiver decoding method based on protograph differential chaos shift keying according to claim 1, wherein a training process of the target extrinsic information-aided network comprises:

acquiring an information bit sequence to be trained, performing a coded modulation on the information bit sequence to be trained via the protograph differential chaos shift keying transmitter, and outputting a plurality of modulated symbols to be trained;

inputting each modulated symbol to be trained into the wireless channel for channel interference, and outputting a received symbol to be trained corresponding to each modulated symbol to be trained;

calculating an initial a-posteriori probability vector to be trained corresponding to each received symbol to be trained according to each received symbol to be trained using a preset log-likelihood ratio calculation method; and on the basis of a preset cross-entropy loss function, performing network training on an initial extrinsic information-aided network using each received symbol to be trained and each initial a-posteriori probability vector to be trained, and determining a well-trained target extrinsic information-aided network.

9. A transceiver decoding system based on protograph differential chaos shift keying, a transceiver comprising a protograph differential chaos shift keying transmitter, a wireless channel, a target extrinsic information-aided network and an a-priori calculation decoder, wherein the system comprises:

an acquisition block, configured to acquire an information bit sequence, perform a coded modulation on the information bit sequence via the protograph differential chaos shift keying transmitter, and output a plurality of modulated symbols;

an interference block, configured to input each modulated symbol into the wireless channel for channel interference, and output a received symbol corresponding to each modulated symbol;

a network output block, configured to use the target extrinsic information-aided network to determine a target a-posteriori probability vector corresponding to each received symbol according to each received symbol and a preset initial a-posteriori probability vector corresponding to each received symbol;

a decoding block, configured to input each target a-posteriori probability vector into the a-priori calculation decoder for decoding, and output an initial decoded bit sequence; and a determination block, configured to determine a target decoded bit sequence according to the initial decoded bit sequence and a preset check matrix; and the target extrinsic information-aided network comprises a convolutional neural network-long short-term memory block, a fully connected block and a decision block; and the network output block comprises:

a first sub-block, configured to use the convolutional neural network-long short-term memory block to perform one-dimensional feature extraction on each received symbol, and generate a first feature vector corresponding to each received symbol;

a second sub-block, configured to use the fully connected block to perform vector feature extraction on the preset initial a-posteriori probability vector corresponding to each received symbol, and determine a second feature vector corresponding to each preset initial a-posteriori probability vector; and a third sub-block, configured to input each first feature vector and each second feature vector into the decision block for feature concatenating separately, and output the target a-posteriori probability vector corresponding to each received symbol.

* * * * *